(12) United States Patent
Gerth et al.

(10) Patent No.: US 12,450,840 B2
(45) Date of Patent: Oct. 21, 2025

(54) CHECKING A PHYSICAL DENTAL ELEMENT USING MOTION TRACKING

(71) Applicant: EXOCAD GMBH, Darmstadt (DE)

(72) Inventors: Maik Gerth, Seeheim-Jugenheim (DE); Paul Schnitzspan, Seeheim-Jugenheim (DE)

(73) Assignee: EXOCAD GMBH, Darmstadt (DE)

(*) Notice: Subject to any disclaimer, the term of this patent is extended or adjusted under 35 U.S.C. 154(b) by 295 days.

(21) Appl. No.: 18/119,068

(22) Filed: Mar. 8, 2023

(65) Prior Publication Data
US 2024/0303935 A1 Sep. 12, 2024

(51) Int. Cl.
*G06T 19/00* (2011.01)
*A61C 13/34* (2006.01)
*G06T 7/73* (2017.01)
*G06T 19/20* (2011.01)

(52) U.S. Cl.
CPC ............ *G06T 19/006* (2013.01); *A61C 13/34* (2013.01); *G06T 7/75* (2017.01); *G06T 19/20* (2013.01); *G06T 2207/30036* (2013.01); *G06T 2219/2016* (2013.01)

(58) Field of Classification Search
None
See application file for complete search history.

(56) References Cited

U.S. PATENT DOCUMENTS

| | | | |
|---|---|---|---|
| 2012/0095732 A1* | 4/2012 | Fisker | G16H 50/50 703/1 |
| 2017/0360536 A1 | 12/2017 | Alqarawi | |
| 2018/0110590 A1 | 4/2018 | Maraj et al. | |
| 2018/0168780 A1 | 6/2018 | Kopelman et al. | |
| 2019/0231493 A1 | 8/2019 | Inglese et al. | |
| 2019/0269482 A1* | 9/2019 | Shanjani | A61B 90/37 |
| 2022/0148185 A1* | 5/2022 | Guillot | G06T 7/187 |
| 2023/0248487 A1* | 8/2023 | Steinbrecher | A61C 5/77 433/213 |

* cited by examiner

Primary Examiner — Tapas Mazumder
(74) Attorney, Agent, or Firm — PERRY + CURRIER INC.

(57) ABSTRACT

Disclosed is a method for checking a geometric form of a physical dental element using motion tracking and augmented reality. The method comprises a receiving of a three-dimensional digital model comprising a three-dimensional digital dental element, as well as repeatedly: a receiving of optical imaging data from an optical sensor device, a detecting of structural elements within the optical imaging data, a determining of a target position for the three-dimensional digital dental element using the reference points defined by the structural elements, and a controlling of an electronic display device for displaying an augmented reality view on the physical dental element augmented with the three-dimensional digital dental element.

20 Claims, 29 Drawing Sheets

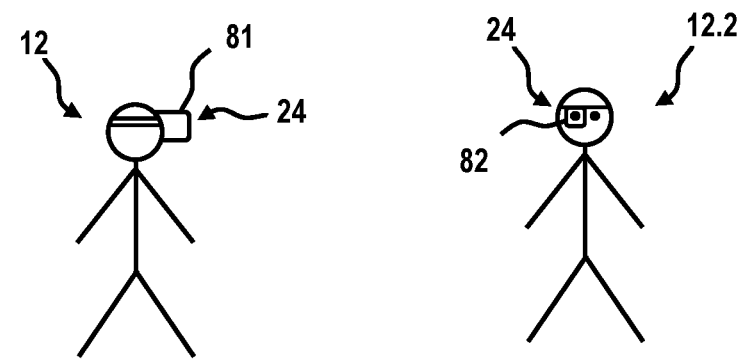
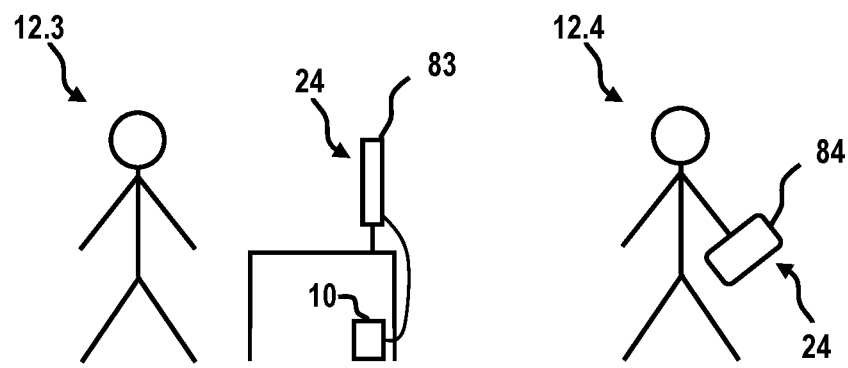
Fig. 35

CHECKING A PHYSICAL DENTAL ELEMENT USING MOTION TRACKING

FIELD OF THE INVENTION

The invention relates to the field of dental technology. More particularly, the invention relates to a method for checking a geometric form of a physical dental element. The invention furthermore relates to a computer device and a computer program product for checking a geometric form of a physical dental element.

BACKGROUND

For a dental element, e.g., a crown, to be arranged within a patient's dentition, in general a precise fitting into the respective dentition is required. A precise fitting may contribute to a long durability of the dental element, since detrimental stress may be avoided. Furthermore, a precise fitting may contribute to a comfortable incorporation of the dental element into the patient's dentition, which may also be satisfying from an aesthetical point of view. Finally, a precise fitting may contribute to ensuring suitable phonetic capabilities of the patient, i.e., the ability of the patient be able to speak clearly with the dental element arranged within the dentition. Thus, a mechanically, phonetically as well as aesthetically adequate fitting of the dental element may be required. However, when manufacturing a physical dental element, unintended deviations of the geometrical form of the dental element from a target geometric form may occur preventing a precise fitting of the dental element. Such deviations may, e.g., be due to errors and/or imprecisions, when designing the dental element. Furthermore, errors and/or imprecisions, when manufacturing the dental element, may contribute to such deviations.

Thus, a checking of the geometric form of the physical dental element may be required, in order to ensure that the geometric form does not comprise such unintended deviations.

It is an objective to provide for a method, a computer device and computer program product for checking a geometric form of a physical dental element using motion tracking and augmented reality. The objectives underlying the invention are solved by the features of the independent claims.

SUMMARY

In one aspect, the invention relates to a method for checking a geometric form of a physical dental element using motion tracking and augmented reality. The method comprises a receiving of a three-dimensional digital model comprising a three-dimensional digital dental element. The three-dimensional digital dental element defines a geometric limit for the geometric form of the physical dental element. The method further comprises repeatedly: a receiving of optical imaging data from an optical sensor device, a detecting of structural elements within the optical imaging data with the structural elements defining reference points for a target position for the three-dimensional digital dental element, a determining of the target position for the three-dimensional digital dental element using the reference points defined by the structural elements, and a controlling of an electronic display device for displaying an augmented reality view on the physical dental element augmented with the three-dimensional digital dental element. At least a part of the three-dimensional digital dental element is arranged at the target position. The augmentation with the at least part of the three-dimensional digital dental element is indicative of whether the geometric form of the physical dental element complies with the geometric limit defined by the three-dimensional digital dental element arranged at the target position.

This method may be beneficial, since it enables a usage of a three-dimensional digital model for checking a geometric form of a physical dental element. Within the optical imaging data structural elements are detected. These structural elements define reference points for a target position for one or more parts of the three-dimensional digital dental element, i.e., using these reference points defined by the structural elements the target position for the one or more parts of the three-dimensional digital dental element may be determined. For example, the structural elements define reference points for a target position for the three-dimensional digital dental element, i.e., using these reference points defined by the structural elements the target position for the three-dimensional digital dental element may be determined.

For acquiring the optical imaging data one or more optical sensor devices, e.g., in form of one or more cameras, may be used. The structural elements may, e.g., be structural elements of the physical dental element and the target position of the three-dimensional digital dental element may be determined relative to the physical dental element, i.e., a position of the physical dental element. For example, the optical imaging data from an optical sensor device may comprise image data of the physical dental element, i.e., the optical sensor may acquire optical imaging data of the physical dental element.

Alternatively or additionally, the structural elements may, e.g., be structural elements of one or more other physical elements and the target position of the three-dimensional digital dental element may be determined relative to these other physical elements, i.e., positions of these physical elements. For example, the optical imaging data from the optical sensor device may comprise image data of these other physical element, i.e., the optical sensor may acquire optical imaging data of the physical dental element.

Furthermore, an electronic display device is used for displaying an augmented reality view on the physical dental element augmented with the three-dimensional digital dental element. The part of the three-dimensional digital dental element is arranged at the target position determined using the reference points. The augmentation with the at least part of the three-dimensional digital dental element is indicative of whether the geometric form of the physical dental element complies with the geometric limit defined by the three-dimensional digital dental element arranged at the target position.

The geometric limit may, e.g., be a direct geometric limit. The three-dimensional digital dental element may, e.g., define a geometric target form of the physical dental element and the geometric form of the physical dental element may be checked, whether it matches the geometric target form defined by the three-dimensional digital dental element. The physical dental element may, e.g., be a digital template used for manufacturing the physical dental element as a physical copy of the three-dimensional digital dental element. In case the check of the geometric form of the physical dental element indicates, that dental material has to be removed from the physical dental element in order for the geometric form to comply with the geometric limit, e.g., match the geometric target form, the respective dental material may be removed, e.g., using machining. In case the check of the geometric form of the physical dental element indicates, that dental material has to be added to the physical dental element in order for the geometric form to comply with the geometric limit, e.g., match the geometric target form, the respective dental material may be added.

Alternatively or additionally, the geometric limit may, e.g., be an indirect geometric limit. The three-dimensional digital dental element may, e.g., define a geometric form of an adjacent structure adjacent to a position, at which the physical dental element is to be arranged within the dentition of the patient. The geometric form of the physical dental element may be required to not be in conflict with the adjacent structure already present in the dentition. Thus, the adjacent structure may define a geometric limit for the physical dental element, which, e.g., is required not to intersect with the respective adjacent structure. In case the physical dental element intersects with the adjacent structure and/or the geometric limit defined by the adjacent structure, intersecting parts of the physical dental element may be removed.

A surface of the physical dental element defined by the geometric form of the physical dental element may be required to not be spaced apart to far from the adjacent structure, i.e., a distance between the surface of the physical dental element and a surface of the adjacent structure facing the surface of the physical dental element may be required to be equal to a predefined value. In case the distance is larger than the predefined value, it may be necessary to add dental material on the surface of the physical dental element, in order to reduce the distance such that it matches the predefined value.

For example, the complete three-dimensional digital dental element is displayed. In case the three-dimensional digital dental element is, e.g., a three-dimensional digital template of the physical dental element, the complete three-dimensional digital template may, e.g., be displayed.

For example, only one or more parts of the three-dimensional digital dental element are displayed. In case the three-dimensional digital dental element is, e.g., an antagonist, e.g., only an occlusal surface of the antagonist may be displayed. In case the three-dimensional digital dental element is, e.g., a neighboring tooth, e.g., only an approximal surface of the neighboring tooth may be displayed.

Using augmented reality to provide a view on the physical dental element augmented with the three-dimensional digital dental element, enable the user to check the physical dental element using the three-dimensional digital dental element. Thus, the physical world may be combined with the digital.

The optical imaging data acquired by the optical sensor device is received repeatedly and the structural elements are determined repeatedly. Thereby, the optical imaging data are used for tracking movements of the structural elements and the target position for the three-dimensional digital dental element is adjusted following movements of the structural elements. Tracking position changes of the structural elements, position changes of the reference points determined for each repetition follow the changes of the structure elements tracked by the optical imaging data. The position changes of the reference points define changes of target position at which the augmented reality view on the physical dental element is augmented with the three-dimensional digital model.

Using a physical dental element enables the user to haptically handle the dental element and to directly adjust the geometric form of the physical dental element, if necessary. In case for the geometric form of the physical dental element to comply with the geometric limit defined by the three-dimensional digital dental element dental material has to be removed from the physical dental element, the respective dental material may be directly removed from the physical dental element. The resulting adjustment of the geometric form of the physical dental element may be tracked, e.g., in real time, using the augmented reality view on the physical dental element augmented with the three-dimensional digital dental element. Thus, it may be checked in real time, whether the adjustment of the geometric form of the physical dental element is sufficient for the geometric form to comply with the geometric limit defined by the three-dimensional digital dental element.

In case for the geometric form of the physical dental element to comply with the geometric limit defined by the three-dimensional digital dental element dental material has to be added to the physical dental element, the respective dental material may be directly added to the physical dental element. The resulting adjustment of the geometric form of the physical dental element may be tracked, e.g., in real time, using the augmented reality view on the physical dental element augmented with the three-dimensional digital dental element. Thus, it may be checked in real time, whether the adjustment of the geometric form of the physical dental element is sufficient for the geometric form to comply with the geometric limit defined by the three-dimensional digital dental element.

The result of the adjustment of the physical dental element may not only be experienced by the user visually, but also haptically.

For example, the three-dimensional digital dental element is a three-dimensional digital template of the physical dental element. The target position for the three-dimensional digital dental element coincides with a position of the physical dental element such that the displayed part of the three-dimensional digital dental element is visually overlaying the physical dental element.

Example may have the beneficial effect, that by overlaying the physical dental element with the three-dimensional digital template, i.e., the three-dimensional digital dental element, it may effectively check, whether the geometric form of the physical dental element matches a geometric target form defined by the geometric form of the three-dimensional digital template. Using the motion tracking, the physical dental element may be turned around and moved, in order to check the geometric form from different directions and perspectives. With the motion tracking, the three-dimensional digital dental element may be turned around and moved in sync with the physical dental element. For example, the structural elements detected within the optical imaging data may be structural elements of the physical dental element. For example, the structural elements detected within the optical imaging data may be structural elements of a structure arranged in a fixed spatial relation to the physical dental element, such that the respective structure is moved with the physical dental element maintaining the fixed spatial relation.

The geometric limit for the geometric form of the physical dental element may, e.g., be provided by the geometric form defined by the three-dimensional digital template, i.e., the geometric form of the three-dimensional digital template. In order to comply with the geometric limit, the geometric form of the physical dental element may be required to match the geometric form of the three-dimensional digital template. When the physical dental element is visually overlaid with the three-dimensional digital template using the augmented reality view, the geometric form of the physical dental element may be required to coincide with the geometric form of the three-dimensional digital template.

For example, a view on the physical dental element, e.g., via a transparent display, is overlaid with the displayed part of the three-dimensional digital dental element. For example, a sequence of images of the displayed part of the three-dimensional digital dental element For example, the optical imaging data comprises imaging data of the physical dental element. A sequence of image of physical dental element generated using the acquired optical imaging data may, e.g., be displayed on a display in combination with a sequence of images of the displayed part of the three-dimensional digital dental element, such that the images of the physical dental element are overlaid with the images of the three-dimensional digital dental element.

When the physical dental element or an image of the physical dental element is overlaid with the three-dimensional digital dental element or at least a part of the three-dimensional digital dental element, it may be checked, whether the geometric form of the physical dental element matches the geometric form defined by the three-dimensional digital template. In case of deviations of the geometric form of the physical dental element from the geometric form defined by the three-dimensional digital template, the physical dental element may be adjusted to reduce or even eliminate these deviations. The adjusting may comprise removing and/or adding dental material from and/or to the physical dental element.

For example, the three-dimensional digital model is a three-dimensional digital model of at least a part of a dentition of a patient, the three-dimensional digital dental element being a three-dimensional digital copy of a dental element comprised by the dentition. The three-dimensional digital model defines a spatial relation of the target position for the three-dimensional digital dental element and a predefined position within the dentition, at which the physical dental element is intended to be arranged.

The optical imaging data from an optical sensor device may, e.g., comprise optical imaging data of physical model of the three-dimensional digital model of at least a part of the dentition of the patient. Thus, the spatial relation of the target position for the three-dimensional digital dental element and the predefined position within the dentition defined by the three-dimensional digital model may be mapped to a spatial relation between target position for the three-dimensional digital dental element and the predefined position within the physical model of the three-dimensional digital model, i.e., the dentition.

The three-dimensional digital dental element may, e.g., be a three-dimensional digital copy of an antagonist or of a neighboring tooth of the predefined position within the dentition of the patient. Checking the geometric limit defined by the three-dimensional digital dental element may thus comprise checking, whether the geometric form of the physical dental element is in conflict with an antagonist or a neighboring tooth, when the physical dental element is arranged at the predefined position within the dentition, e.g., physical model of the dentition. For example, it may further be check, whether a distance between the physical dental element and an antagonist or a neighboring tooth matches a predefined value.

For example, the three-dimensional digital dental element is a scaled-up three-dimensional digital copy of the dental element comprised by the dentition, which is scaled up by a predefined scaling factor.

By using a scaled-up three-dimensional digital copy of an antagonist or of a neighboring tooth an additional safety margin may be taken into account, when determining whether the geometric form of the physical dental element complies with the geometric limit defined by the three-dimensional digital dental element, i.e., the scaled-up three-dimensional digital copy.

For example, the electronic display device is controlled to adjust a degree of translucency of the displayed three-dimensional digital dental element in response to receiving an input requesting an adjustment of the degree of translucency.

The physical dental element or an image of the physical dental element may be visible through the displayed three-dimensional digital dental element. Thus, the geometric form of the physical dental element and the three-dimensional digital dental element, in particular a geometric form of the three-dimensional digital dental element, may be visible at the same time. Thus, it may be easily checked, whether the geometric form of the physical dental element matches the geometric form of the three-dimensional digital dental element.

A degree of translucency of the displayed three-dimensional digital dental element may be adjustable. For example, the degree of translucency is adjustable from opacity to transparency. By adjusting the degree of translucency, the physical dental element or an image of the physical dental element may be more or less visible through the displayed three-dimensional digital dental element.

For example, the electronic display device is configured to augment a visual perception of the physical dental element by a user of the electronic display device with the part of the displayed three-dimensional digital dental element.

The electronic display device may, e.g., one of the following: eyeglasses with the displayed part of the three-dimensional digital dental element being projected through or reflected off a surface of a transparent lens piece of the eyeglasses; a head-up display; contact lenses; an eyetap; a virtual retinal display.

A head-up display, in particular a portable head-mounted head-up display, may be configured to show the three-dimensional digital dental element arranged at the determined target position, while a user views the real-world with the physical dental element. The head-up display is a transparent display that presents displays the three-dimensional digital dental element without requiring users to look away from the physical dental emblement, which may be visible through the transparent display.

For example, a contact lens may be used comprising a display element for display embedded into the lens. This display element may, e.g., comprise an integrated circuitry, LEDs and an antenna for wireless communication. The display element may be configured for displaying the three-dimensional digital dental element, while the user views the physical dental element through the lens.

For example, an eyetap may be used, which is configured to be worn in front of an eye. The eyetap may act as a camera to record the scene available to the eye, which comprises the physical dental element, as well as a display to superimpose computer-generated imagery comprising the three-dimensional digital dental element on the original scene available to the eye. The eyetap may, e.g., use a beam splitter to send the same scene comprising the physical dental element to one or to both the eye and a camera. The camera may digitize the reflected image of the scene and sends it to a computer. The computer may process the image, augment it with the three-dimensional digital dental element arranged at the target position and send the processed image to a projector. The projector may send the processed image to the other side of the beam splitter so that this computer-generated image augmented three-dimensional digital dental element with the is reflected into the eye to be superimposed on the original scene with the physical dental element.

A virtual retinal display refers to a display, which is scanned directly onto the retina of a user's eye. The user may see what appears to be a conventional display floating in space, which displays the three-dimensional digital dental element. This floating display with the three-dimensional digital dental element may be overlay a scene viewed by the user, which comprises the physical dental element.

For example, the electronic display device comprises a non-transparent display displaying the part of the three-dimensional digital dental element in combination with a continuous sequence of frames. The frames are generated using images generated using the repeatedly received optical imaging data. The repeatedly received optical imaging data comprises optical imaging data of the physical dental element.

The electronic display device mays, e.g., one of the following: a computer screen; a display of a laptop computer; a display of a tablet; a display of a smartphone; a projector configured to project images onto a surface, e.g., a projection screen.

For example, the displayed part of the three-dimensional digital dental element is updated for each frame displayed by the electronic display device.

The electronic display device may, e.g., be provided in form of a headset, like a virtual reality headset, comprising one or more cameras to intercept a real-world view in form of optical imaging data acquired by the cameras and re-display an augmented reality view using a display comprised by the headset. The displayed augmented reality view is augmented with the three-dimensional digital dental element. The displayed at least part of the three-dimensional digital dental element is displayed arranged at the target position.

For example, the repeatedly receiving of the optical imaging, detecting of the structural elements, and determining of the target position is performed with a repetition rate matching a frame rate, with which the electronic display device being controlled to display the augmented reality view.

Example may have the beneficial effect that the determining of the target position and thus the motion tracking may be performed with the same rate as the frame rate resulting in a real time impression of the motion tracking. The target position for the three-dimensional digital dental element may be updated with the same rate as the frame rate.

For example, the electronic display device is controlled to display frames comprising images of the physical dental element. The frames are generated using the repeatedly received optical imaging data comprising optical imaging data of the physical dental element.

For example, the detected structural elements comprise structural elements of the physical dental element. Thus, the target position may be determined relative the physical dental element providing the reference points defined by the structural elements of the physical dental element. The structural elements may, e.g., comprise contour points and/or contour lines of the physical dental element. For detecting these contour points and/or contour lines of the physical dental element, a three-dimensional model of these contour points and/or contour lines of the physical dental element may be used. The three-dimensional model of these contour points and/or contour lines of the physical dental element may, e.g., be received in addition to the three-dimensional digital model.

In case the three-dimensional digital dental element is a three-dimensional digital template of the physical dental element, the target position may coincide with the position of the detected structural elements. Thus, the structural elements of the physical dental element themselves may indicate the target position.

In case the three-dimensional digital dental element is, e.g., an antagonist or neighboring tooth, the target position is defined by a spatial relation of the target position, i.e., the position of the antagonist or neighboring tooth, and a predefined position for the physical dental element within the patient's dentition. This spatial relation is, e.g., defined by the three-dimensional digital model comprising at least a part of the dentition of the patient. The structural elements of the physical dental element may indicate the predefined position for the physical dental element and this predefined position may be used to determine the target position using the spatial relation between the predefined position indicated by the physical dental element and the target position to be determined.

For example, a size of the displayed three-dimensional digital dental element is scaled up by an inverse of a shrinking factor descriptive of a shrinking of a dental material of the physical dental element in case the physical dental element is subject to a curing.

In case the physical dental element is subject to a curing, the geometric form of the physical dental element may be checked before the physical dental element is cured, i.e., as long as the geometric form of the physical dental element is rather easily corrected. In order for the physical dental element to have the right size after the curing, the physical dental element may be manufactured scaled up relative to the intended final size by the inverse of the shrinking factor descriptive of the shrinking of the dental material of the physical dental element. Thus, the scaling up compensates the shrinking due to the curing.

In order to define the correct geometric limit for the scaled-up geometric form of the scaled-up physical dental element, the displayed three-dimensional digital dental element may be scaled up as well by the same scaling factor, i.e., the inverse shrinking factor.

Example may have the beneficial effect, that a suitable definition of the geometric limit may be provided even for a scaled-up physical dental element.

For example, the physical dental element is arranged within a physical model of the dentition of the patient. The optical imaging data comprises optical imaging data of the physical model of the dentition. The detected structural elements comprise structural element of the physical model of the dentition.

The structural elements, e.g., comprising contour point points and/or contour lines of dental elements comprised by the physical model of the dentition. For detecting these contour points and/or contour lines of the physical dental element, a three-dimensional model of these contour points and/or contour lines of the physical model of the dentition of the patient may be used. The three-dimensional model of these contour points and/or contour lines of the physical model may, e.g., be received in addition to the three-dimensional digital model.

In case the three-dimensional digital dental element is a three-dimensional digital template of the physical dental element, the target position, i.e., a predefined position for the physical dental element within the patient's dentition, is defined by a spatial relation of the target position and a position of the structural elements within the dentition. This spatial relation is, e.g., defined by the three-dimensional digital model comprising at least a part of the dentition of the patient. The structural elements define a position within the dentition. Starting from this position using the spatial relation defined by the three-dimensional digital model, which may comprise these structural elements as well, the target position relative to the position of the structural elements may be defined.

In case the three-dimensional digital dental element is, e.g., a neighboring tooth, and the detected structural elements comprise structural elements of the physical dental element comprised by the physical model, the target position is defined by a spatial relation of the target position, i.e., the position of the neighboring tooth, and the position of the physical dental element within the physical model. This spatial relation is, e.g., defined by the three-dimensional digital model comprising at least a part of the dentition of the patient. Starting from this position using the spatial relation defined by the three-dimensional digital model, which may comprise a digital model of physical dental element with these structural elements as well, the target position relative to the position of the structural elements may be defined.

In case the three-dimensional digital dental element is, e.g., an antagonist or neighboring tooth, and the detected structural elements comprising structural element of a further dental element comprised by the physical model, the target position is defined by a spatial relation of the target position, i.e., the position of the antagonist or neighboring tooth, and the position of this further dental element within the patient's dentition. This spatial relation is, e.g., defined by the three-dimensional digital model comprising at least a part of the dentition of the patient. Starting from this position using the spatial relation defined by the three-dimensional digital model, which may comprise the further dental element with these structural elements, the target position relative to the position of the structural elements may be defined.

For example, a size of the physical model of the dentition of the patient is scaled up by the inverse of the shrinking factor descriptive of the shrinking of the dental material of the physical dental element in case the physical dental element being subject to a curing.

In case the physical dental element is subject to a curing, the geometric form of the physical dental element may be checked before the physical dental element is cured, i.e., as long as the geometric form of the physical dental element is rather easily corrected. In order for the physical dental element to have the right size after the curing, the physical dental element may be manufactured scaled up relative to the intended final size by the inverse of the shrinking factor descriptive of the shrinking of the dental material of the physical dental element. Thus, the scaling up compensates the shrinking due to the curing.

In case the physical model of the dentition should be configured to comprise the scaled-up physical dental element, the physical model of the dentition may be scaled up by the same scaling factor, i.e., the inverse shrinking factor, in order to ensure that the relative positions defined by the physical model of the dentition relative to the scaled-up physical dental element are correct.

For example, the target position of the three-dimensional digital dental element in form of the three-dimensional digital template of the physical dental element defines a predefined position within the physical model, at which the physical dental element is intended to be arranged. The displaying of the part of the three-dimensional digital template at the predefined position is indicative of a deviation between the position of the physical dental element and the predefined position.

This may enable a user the adjust the position of the physical dental element within the physical model of the dentition, in order to reduce or compensate the deviations. The electronic display device may display an augmented reality view on the physical dental element arranged within the physical model of the dentition augmented with the three-dimensional digital dental element arranged at the target position, i.e., the predefined position at which the physical dental element is intended to be arranged. Thus, the current position at which the physical dental element is currently arranged within the physical model of the dentition may be compared with the predefined position at which the physical dental element is intended to be arranged. In case the current position deviates from the predefined position, the current position may be adjusted such that it matches the predefined position. Thus, the augmented reality view on the physical dental element augmented with the three-dimensional digital dental element may be used for positioning the physical dental element within the physical model of the dentition.

For example, the method further comprises detecting the geometric form of the physical dental element using the repeatedly received optical imaging data. In case the optical imaging data acquired using the optical sensor comprises optical imaging data of the physical dental element, this optical imaging data may be used for detecting the geometric form of the physical dental element.

For example, the method further comprises determining one or more intersections of a surface of the physical dental element and a surface of the three-dimensional digital dental element arranged at the target position. The displaying of the part of the three-dimensional digital dental element is indicative of the one or more intersections. For determining the one or more intersections, the detected geometric form of the physical dental element may be used.

For example, the one or more intersections of the displayed three-dimensional digital dental element may be highlighted. This may enable a user to identify efficiently sections of the physical dental element intersecting with the three-dimensional digital dental element, since the intersections comprised by the three-dimensional digital dental element are highlighted. The geometric form of the physical dental element may be adjusted by removing dental material from the physical dental element which is intersects with the three-dimensional digital dental element, i.e., is highlighted by the highlighted intersections.

For example, the method further comprises determining one or more sections of the physical dental element, which are violating the geometric limit for the geometric form using the intersections. The electronic display device is further controlled to highlight the determined one or more sections of the physical dental element. Highlighting these sections of the physical dental element, may facilitate adjusting the geometric form of the physical dental element. The geometric form may be adjusted by removing the highlighted sections, in order to adjust the geometric form such that it complies with the geometric limit.

For example, the method further comprises determining one or more parts of the three-dimensional digital dental element in form of the three-dimensional digital template of the physical dental element extending beyond the detected geometric form of the physical dental element. The electronic display device is controlled to display only the determined one or more parts of the three-dimensional digital dental element extending beyond the detected geometric form of the physical dental element.

This may enable a user to adjust the geometric form of the physical dental element by adding dental material to the physical dental element. In order adjust the geometric form of the physical dental element, e.g., dental material may be added at the positions and in the form of the displayed parts of the three-dimensional digital dental element extending beyond the detected geometric form of the physical dental element. In case the adjusted geometric form of the physical dental element with the dental material added matches the combination of the geometric form of the physical dental element with the displayed parts of the three-dimensional digital dental element extending beyond the detected geometric form, the adjusted geometric form may comply with the geometric limit, i.e., coincide with the same.

For example, the method further comprises receiving a three-dimensional digital structural model defining the structural elements and their spatial relations to each other. Using such a structural model may facilitate the detection, i.e., recognition of these structural elements defined by the structural model. The structural model may, e.g., generated using the three-dimensional digital model. For example, characteristic geometric features, like contour lines and/or contour points, may be extracted from the three-dimensional digital model as structural elements. These extracted structural elements and a definition of their spatial relations to each other may be provided in form of the structural model.

The three-dimensional digital structural model is, e.g., a three-dimensional digital structural model of the physical dental element defining characteristic structural elements of the physical dental element and their spatial relations to each other. The characteristic structural elements, e.g., comprising characteristic contour point points and/or contour lines of the physical dental element. The structural model may, e.g., be generated using the three-dimensional digital template of the physical dental element. Using the structural model may facilitate the detection, i.e., recognition of the structural elements comprised by the physical dental element, since the structural model defines what to look for.

The three-dimensional digital structural model is, e.g., a three-dimensional digital structural model of a dentition of a patient defining characteristic structural elements of the dentition and their spatial relations to each other. A physical model of the dentition resembling the dentition of the patient may comprise these characteristic structural elements. The characteristic structural elements, e.g., comprising characteristic contour point points and/or contour lines of the physical model. The structural model may, e.g., be generated using the three-dimensional digital model. Using the structural model may facilitate the detection, i.e., recognition of the structural elements comprised by the physical model of the dentition, since the structural model defines what to look for.

For example, the structural elements comprise one or more artificial structural markers. Using artificial marker as the structural elements may facilitate the detection of the structural elements, since the artificial marker may be easier to be detected. For example, the artificial structural markers may be formed such that they are easily distinguished from other structural elements, in particular elements of dental structures.

For example, the three-dimensional digital structural model may comprise the artificial structural markers. The three-dimensional digital structural model may, e.g., comprise characteristic contour point points and/or contour lines of the artificial structural markers. The structural model may, e.g., be generated using the three-dimensional digital template of the physical dental element to which artificial structural markers are digitally added.

The three-dimensional digital dental element may, e.g., be a three-dimensional digital restorative tooth model, i.e., a three-dimensional digital model of a target state of one or more teeth to be achieved by the one or more restorative measures. This three-dimensional digital dental element as a target state model of the respective tooth may, e.g., resemble a state of one or more teeth of a patient to be achieved, i.e., it may be a digital template. The three-dimensional digital dental element may, e.g., be generated by a computer system executing the method for determining the parameters of the ortho-restorative measures or it may be received from an external source. The external source may, e.g., be a server, like a cloud server, providing the three-dimensional digital dental element via a network. The external source may, e.g., be a removable storage device providing the three-dimensional digital dental element via a direct communication connection, e.g., wireless or via a wire.

For generating the three-dimensional digital dental element, e.g., one or more three-dimensional digital library tooth models from a digital tooth library may be used. For example, the one or more three-dimensional digital library tooth models may in addition be adjusted to the dentition of the patient. For example, one or more three-dimensional digital models of one or more other teeth of the patient's dentition, e.g., one or more opposite tooth within the same dental arch or one or more antagonists, may be used for generating the three-dimensional digital dental element. The one or more three-dimensional digital models of the other tooth may be generated, e.g., using scan data of the respective other teeth. For example, the one or more three-dimensional digital models of the one or more other teeth may in addition be adjusted to the dentition of the patient. For example, the one or more three-dimensional digital tooth models descriptive of a current state of one or more the teeth within the dentition may be used for generating the three-dimensional digital dental element. For example, the one or more three-dimensional digital tooth models may be adjusted to resemble a target state of one or more teeth to be achieved by using the three-dimensional digital dental element. For example, the three-dimensional digital dental element may be generated from scratch.

For example, a trained machine learning module may be used for generating the three-dimensional digital dental element. For generating the three-dimensional digital dental element, the trained machine learning module may, e.g., use a three-dimensional digital detention model. The three-dimensional digital detention model may, e.g., e descriptive of a current state of a detention of a patient, to which the dental element described by the three-dimensional digital dental element is to be applied. The three-dimensional digital dental element may be received as output from the trained machine learning module in response to providing the three-dimensional digital detention model as input. The trained machine learning module may be trained to provide the three-dimensional digital dental element as output in response to receiving the three-dimensional digital detention model as input.

For example, a providing of the trained machine learning module may comprise providing a machine learning module to be trained. A set of training datasets may be provided for training the machine learning module to be trained. For example, each training dataset may comprise a three-dimensional digital training dentition model as well as a three-dimensional digital training restorative tooth model. The machine learning module to be trained may be trained to provide the three-dimensional digital training dental elements of the training datasets as an output in response to receiving the three-dimensional digital training dentition models of the respective training datasets as input.

The machine learning module to be trained may, e.g., be an untrained machine learning module, a pre-trained machine learning module or a partially trained machine learning module. The machine learning module being trained may be an untrained machine learning module, which is trained from scratch. Alternatively, the machine learning module being trained may be a pre-trained or partially trained machine learning module. In general, it may not be necessary to start with an untrained machine learning module, e.g., in deep learning. For example, one may start with a pre-trained or partially trained machine learning module. The pre-trained or partially trained machine learning module may have been pre-trained or partially trained for the same or a similar task. Using a pre-trained or partially trained machine learning may, e.g., enable a faster training of the trained machine learning module to be trained, i.e., the training may converge faster. For example, transfer learning may be used for training a pre-trained or partially trained machine learning module. Transfer learning refers to a machine learning process, which rather than starting the learning process from scratch starts from patterns that have been previously learned, when solving a different problem. This way previous learnings may, e.g., be leveraged, avoiding to start from scratch. A pre-trained machine learning module is a machine learning module that was trained previously, e.g., on a large benchmark dataset to solve a problem similar to the one to be solved by the additional learning. In case of a pre-trained machine learning module a previous learning process has been completed successfully. A partially trained machine learning module is a machine learning module, which has been partially trained, i.e., the training process may not have been completed yet. A pre-trained or partially machine learning module may, e.g., be import and trained to be used for the purposes disclosed herein.

The term "machine learning" (ML) refers to a computer algorithm used to extract useful information from training data sets by building probabilistic models, which are referred to as machine learning modules or models, in an automated way. A machine learning module may also be referred to as a predictive model. Machine learning algorithms build a mathematical model based on sample data, known as "training data", in order to make predictions or decisions without being explicitly programmed to perform the task. The machine learning module may be performed using a learning algorithm such as supervised or unsupervised learning. The machine learning module may be based on various techniques such as clustering, classification, linear regression, reinforcement, self-learning, support vector machines, neural networks, etc. A machine learning module may, e.g., be a data structure or program such as a neural network, in particular a convolutional neural network, a support vector machine, a decision tree, a Bayesian network etc. The machine learning module may be adapted to predict an unmeasured value, e.g., a three-dimensional digital dental element as output by the trained machine learning module. The trained machine learning module may predict the unmeasured value from other, known values, e.g., a three-dimensional digital detention model as input. According to an example, the machine learning module may comprise a deep learning model.

The three-dimensional digital dentition model may, e.g., be a three-dimensional digital model of a current state the dentition. This three-dimensional digital dentition model may be generated using the scan data of a direct and/or indirect scan of the dentition. The three-dimensional digital dentition model as a current state model of the respective dentition may resemble an actual state of the patient's dentition, i.e., it may be a digital replica of the physical dentition. The three-dimensional digital dentition model of the respective tooth may, in particular, resemble the geometric form of the physical dentition as well as the relative positions of the teeth comprised by the dentition. The three-dimensional digital dentition model may be generated by the computer system or it may be received from an external source. The external source may, e.g., be a server, like a cloud server, providing the three-dimensional digital dentition model via a network. The external source may, e.g., be a removable storage device providing the three-dimensional digital dentition model via a direct communication connection, e.g., wireless or via a wire.

For example, the physical dental element is one of the following: a veneer, an inlay, an onlay, an overlay, a crown, a bridge, a mockup, a waxup, a bitesplint, a provisional, a dental bar, a denture, an overdenture.

is a layer of restoration material placed over a tooth, in order to cover one or more surfaces of the tooth. Veneers may, e.g., improve the aesthetics of a smile and/or protect the tooth's surface from damage. Indirect veneers are manufactured outside of a patient's oral cavity and then arranged on a tooth within the oral cavity. Direct veneers are built-up directly on a tooth inside a patient's oral cavity. The tooth may be prepared for receiving the veneer.

For example, two main types of restoration material may be used for manufacturing a veneer: composite and dental porcelain. A composite veneer may be directly placed on the tooth, i.e., built-up in the mouth of patient, or indirectly manufactured outside the mouth of the patient and later bonded to the tooth. In contrast, a porcelain veneer may only be indirectly manufactured outside the mouth of the patient. A full veneer crown, on the one hand, is dental restoration element that is configured to cover all the coronal tooth surfaces, i.e., the mesial, distal, facial, lingual and occlusal surfaces. A laminate veneer, on the other hand, is a thin layer of restoration material that may, e.g., cover only a single surface of a tooth, e.g., a labial surface. A laminate veneer may generally be used for aesthetic purposes.

Inlays, onlays, and overlays are forms of indirect restoration manufactured outside of a patient's oral cavity as a single, solid piece that fits a specific size and shape of a reception prepared within a tooth of the oral cavity. The inlay, onlay, or overlay is arranged within the respective reception and bonded, e.g., cemented, in place on the prepared tooth. In contrary to a crown, inlays, onlays, and overlays are arranged within a reception prepared within a damaged tooth.

An inlay is configured to cover an inner, e.g., central, section of an occlusal surface of a tooth. Thus, an inlay may be used to replace an internal part of a damaged tooth and cover part of the occlusal surface of the respective tooth. The inlay is positioned within hard tissues of the tooth, but does not cover a cusp or pointed part of the tooth. In comparison to an inlay, an onlay in addition covers at least one of the cusps of the tooth. In comparison to an onlay, an overlay covers a larger portion of the occlusal surface of the tooth extending beyond the cusps.

The inlays, onlays, and overlays may, e.g., be configured as pinlays. Pinlays are characterized by an additional use of pins to increase their retention. Thus, any inlay, onlay, or overlay may be configured as a pinlay by being braced by pins. Such a pin may, e.g., be inserted at an edge of the tooth or parallel to a groove. In general, the base of a pin is selected to lie in a section of the tooth surface that is free of damage.

A crown is a dental restoration element in form of a dental cap. Such a crown may, e.g., be provided in form of a full coverage crown or a partial crown, like a ⅞ crown or a ¾ crown. Partial crowns, like ⅞ and ¾ crowns, are hybrids between an onlay and a full coverage crown. They are categorized based on an estimated degree of wall coverage of the walls of the prepared tooth, on which the respective crown is arranged. For example, a ¾ crown aims to cover three thirds of the walls of the tooth to be restored, e.g., three out of the four walls, e.g., with the buccal wall being spared. For example, a ⅞ crown aims to cover seven eights of the walls of the tooth to be restored. A full coverage crown completely caps or encircles a prepared tooth. A crown may, e.g., be required when a large cavity threatens the health of a tooth. A crown may be bonded to the tooth prepared for receiving the crown using a bonding material, e.g., a dental cement. A crown may be made from various materials, which may be fabricated using indirect methods, i.e., outside the patient's oral cavity. Crowns may be used to improve strength, to improve appearance of teeth and/or to halt deterioration.

A bridge is a dental restoration element in form of a permanent appliance used to replace one or more missing teeth. A dental bridge comprises a plurality of artificial dental elements that are fused together, e.g., one or more artificial replacement teeth are definitively joined to adjacent teeth. A conventional bridge may be supported, e.g., by full coverage crowns, partial crowns, overlays, onlays or inlays on the abutment teeth. The abutment teeth require preparation and reduction to support the bridge.

A mockup prosthetic restoration composite is a composite to be arranged within a patient*'s mouth in order to visualize for the patient a result of a prosthetic restoration, before the actual prosthetic restoration is executed. Thus, the patient as well as a dentist may asses the expected esthetic and functional outcome of the prosthetic restoration. The final result to be expected may thus be visualized at an early stage of planning prosthetic restoration. This approach may ensure that the patient as well as the dentist may the same result to be achieved in mind and allows for potential adjustments to be made prior to the final restorations manufactured and applied, e.g., cemented.

A waxup prosthetic restoration refers to a prosthetic restoration made from laboratory wax. Such a waxup prosthetic restoration is used for acquiring information indicative of whether a specific prosthetic restoration is appropriate. A planned prosthetic restoration may be generated using from laboratory wax. The waxup prosthetic restoration may be used to test, whether the planned prosthetic restoration is appropriate. Using wax may have the beneficial effect, that the waxup prosthetic restoration may be easily adjusted to also test adjustments of the planned prosthetic restoration and/or adjusting the planned prosthetic restoration to requirements determined using the waxup prosthetic restoration.

A bitesplint is a device that covers the teeth in order to protect them. For example, a bite splint may be used to protect the teeth against damages against accidental impacts external impacts. For example, a bite splint may be used to protect the teeth against damages caused by bruxism and/or temporomandibular disorders (TMD). Furthermore, a bitesplint may be used as part of certain dental procedures, such as tooth bleaching or sleep apnea prevention.

A provisional is a type of interim dental restoration designed to be a template for the final restoration. It is used to verify, e.g., a comfort in occlusion for the patient, esthetic parameters that satisfy the patient's and dentist's expected goals and/or phonetic evaluation for speech and airflow. Esthetic parameters ma, e.g., comprise shape, midlines, smile line, embrasure shapes, and/or position of contacts. The phonetic evaluation for speech and airflow may ensure that no sibilance, whistlers, and/or lisp occur and a clear articulation being enabled by the prosthetic restoration resembled by the provisional.

A dental bar refers to a bar, which is mounted in a patient's mouth, e.g., using implants, and configured to support a denture. The denture is configured to snap onto the bar, in order to be held in place by the bar.

A denture is a prosthetic devices constructed to replace missing teeth and configured to be supported by the surrounding soft and hard tissues of the oral cavity. A denture may, e.g., be removable, referred to as a removable partial denture or removable complete denture. Furthermore, there are dentures configured to be bonded or clasped onto teeth or dental implants. A partial mandibular denture may, e.g., replace a part of a mandibular dental arch. A complete mandibular denture may, e.g., replace a full mandibular dental arch. A partial maxillary denture may, e.g., replace a part of a mandibular dental arch. A complete maxillary denture may, e.g., replace a full mandibular dental arch.

An overdenture refers to specific type of denture, i.e., a removable denture that covers and rests on one or more remaining natural teeth, the roots of natural teeth, and/or dental implants.

In another aspect, the invention relates to a computer program product for checking a geometric form of a physical dental element using motion tracking and augmented reality. The computer program product comprises a computer readable storage medium having program instructions embodied therewith. The program instructions are executable by a processor of a computer device to cause the computer device to receive a three-dimensional digital model comprising a three-dimensional digital dental element, the three-dimensional digital dental element defining a geometric limit for the geometric form of the physical dental element. The program instructions is further executable by the processor of the computer device to cause the computer device to repeatedly: receive optical imaging data from an optical sensor device, detect structural elements within the optical imaging data with the structural elements defining reference points a target position for the three-dimensional digital dental element, determine the target position for the three-dimensional digital dental element using the reference points defined by the structural elements, and control an electronic display device for displaying an augmented reality view on the physical dental element augmented with the three-dimensional digital dental element. At least a part of the three-dimensional digital dental element is arranged at the target position. The augmentation with the at least part of the three-dimensional digital dental element is indicative of whether the geometric form of the physical dental element complies with the geometric limit defined by the three-dimensional digital dental element arranged at the target position.

The program instructions provided by the computer program product may further be executable by the processor of the computer device to cause the computer device to execute any of the aforementioned examples of the method for checking the geometric form of the physical dental element using motion tracking and augmented reality.

In another aspect, the invention relates to a computer program for checking a geometric form of a physical dental element using motion tracking and augmented reality. The computer program comprises program instructions. The program instructions are executable by a processor of a computer device to cause the computer device to receive a three-dimensional digital model comprising a three-dimensional digital dental element, the three-dimensional digital dental element defining a geometric limit for the geometric form of the physical dental element. The program instructions is further executable by the processor of the computer device to cause the computer device to repeatedly: receive optical imaging data from an optical sensor device, detect structural elements within the optical imaging data with the structural elements defining reference points for a target position for the three-dimensional digital dental element, determine the target position for the three-dimensional digital dental element using the reference points defined by the structural elements, and control an electronic display device for displaying an augmented reality view on the physical dental element augmented with the three-dimensional digital dental element. At least a part of the three-dimensional digital dental element is arranged at the target position. The augmentation with the at least part of the three-dimensional digital dental element is indicative of whether the geometric form of the physical dental element complies with the geometric limit defined by the three-dimensional digital dental element arranged at the target position.

The program instructions provided by the computer program may further be executable by the processor of the computer device to cause the computer device to execute any of the aforementioned examples of the method for closing the one or more holes in the bottom section of the three-dimensional digital preparation model of the preparation of the tooth.

In another aspect, the invention relates to a computer device for checking a geometric form of a physical dental element using motion tracking and augmented reality. The computer device comprising a processor and a memory storing program instructions executable by the processor. The computer device further comprises means for controlling an electronic display device for displaying at least a part of a three-dimensional digital dental element. Execution of the program instructions by the processor causes the computer device to receive a three-dimensional digital model comprising a three-dimensional digital dental element, the three-dimensional digital dental element defining a geometric limit for the geometric form of the physical dental element. Execution of the program instructions by the processor further causes the computer device to repeatedly: receive optical imaging data from an optical sensor device, detect structural elements within the optical imaging data with the structural elements defining reference points for a target position for the three-dimensional digital dental element, determine the target position for the three-dimensional digital dental element using the reference points defined by the structural elements, and control the electronic display device for displaying an augmented reality view on the physical dental element augmented with the three-dimensional digital dental element. At least a part of the three-dimensional digital dental element is arranged at the target position. The augmentation with the at least part of the three-dimensional digital dental element is indicative of whether the geometric form of the physical dental element complies with the geometric limit defined by the three-dimensional digital dental element arranged at the target position.

Execution of the program instructions by the processor may further cause the computer device to execute any of the aforementioned examples of the method for checking the geometric form of the physical dental element using motion tracking and augmented reality.

It is understood that one or more of the aforementioned embodiments may be combined as long as the combined embodiments are not mutually exclusive.

BRIEF DESCRIPTION OF THE DRAWINGS

In the following, examples are described in greater detail making reference to the drawings in which:

FIG. 35 shows exemplary electronic display device for displaying an augmented reality view.

DETAILED DESCRIPTION

Figure 1:
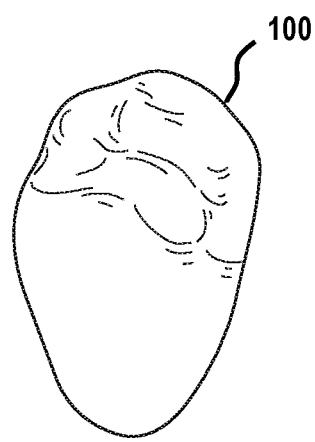
FIG. 1 shows an exemplary physical dental element.

In the following, similar elements are denoted by the same reference numerals.

Figure 2:
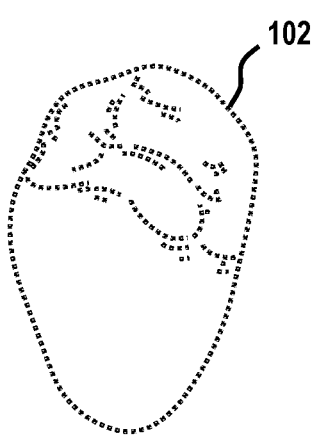
FIG. 2 shows an exemplary three-dimensional structural digital structural model configured for detecting the physical dental element of FIG. 1.
Figure 3:
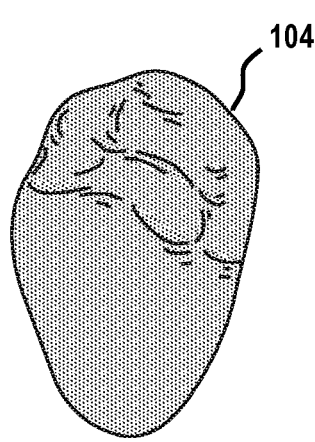
FIG. 3 shows an exemplary three-dimensional digital dental element in form of a digital template for the physical dental element of FIG. 1.

FIG. 1 shows an exemplary physical dental element 100. The exemplary physical dental element 100 of FIG. 1 has the form of a crown. FIG. 2 shows an exemplary three-dimensional structural digital structural model 102 configured for detecting the physical dental element 100 of FIG. 1 in form of a crown. The structural model 102 defines structural elements to be detected in optical imaging data of the physical dental element 100 of FIG. 1 as well as their spatial relations to each other. The structural model 102 in FIG. 2 is a contour model defining contour lines of the exemplary physical dental element 100 of FIG. 1. The structural model 102 of FIG. 2 may, e.g., be generated using a three-dimensional digital model of the dental element, i.e., a three-dimensional digital dental element, like the one shown in FIG. 3. Alternatively, a structural model 102 may be provided, which only defines contour lines and/or contour points of parts of the exemplary physical dental element 100 of FIG. 1. By detecting the structural elements defined by the structural model 102, the physical dental element 100 may be detected within optical imaging data acquired by an optical sensor device, e.g., a camera. For example, position, orientation, and size of the physical dental element 100 within the optical imaging data may be determined. FIG. 3 shows an exemplary three-dimensional digital model of the dental element, i.e., a three-dimensional digital dental element 104. The three-dimensional digital dental element 104 is, e.g., a three-dimensional digital template for the physical dental element 100 of FIG. 1. The three-dimensional digital dental element 104 may, e.g., be used to check the geometric form of the physical dental element 100 of FIG. 1.

Figure 4:
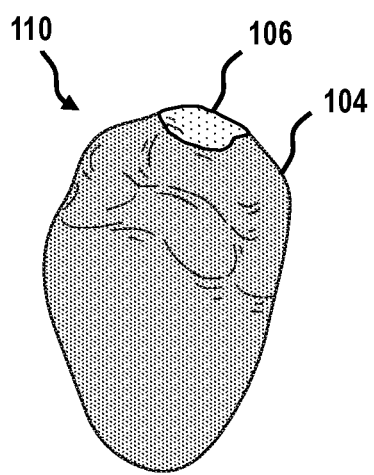
FIG. 4 shows an exemplary augmented reality view on the physical dental element of FIG. 1.

FIG. 4 shows an exemplary augmented reality view on the physical dental element 100 of FIG. 1. Here and in the following an augmented reality view may, e.g., be provided by an electronic display device, which is configured to augment a visual perception of the physical dental element 100 by a user of the electronic display device with the displayed three-dimensional digital dental element 104 and/or a displayed part of the three-dimensional digital dental element 104. The three-dimensional digital dental element 104 may, e.g., be displayed on, projected through or reflected off a surface of a transparent display, e.g. a lens piece. For example, the electronic display device providing the augmented reality view may comprise a non-transparent display displaying the part of the three-dimensional digital dental element 104 in combination with a continuous sequence of frames comprising optical imaging data of the physical dental element 100.

Figure 5:
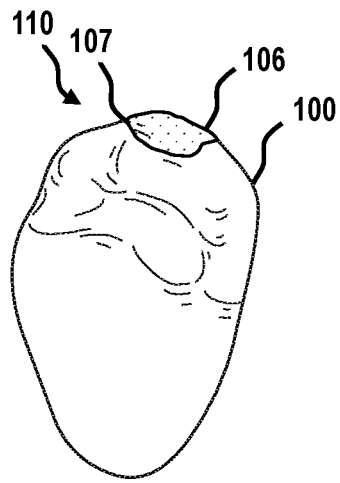
FIG. 5 shows an exemplary augmented reality view on the physical dental element of FIG. 1.

Optical imaging data of the physical dental element 100 may, e.g., additionally be used to detect the geometric form of the physical dental element 100. The three-dimensional digital dental element 104 is arranged at a target position, e.g., at the same position at which the physical dental element 100 is detected within the optical imaging data. As illustrated in FIG. 4, a section 106 of the physical dental element 100 extends beyond the geometrical form defined by the three-dimensional digital dental element 104 overlayed over the physical dental element 100. For example, the section 106 violating the geometric limit may be highlighted, in order to indicate, which section of the physical dental element 100 has to be adjusted, e.g., removed, to comply with the geometric limit defined by the three-dimensional digital dental element 104. FIG. 5 shows an alternative augmented reality view on the physical dental element 100 of FIG. 1, in which the only part of the three-dimensional digital dental element 104 being depicted is the boundary line 107 of section 106 defining an intersection between a surface of the physical dental element 100 and a surface of the three-dimensional digital dental element 104. The section 106 of the physical dental element 100 beyond the geometrical form defined by the three-dimensional digital dental element 104 is highlighted.

Figure 6:
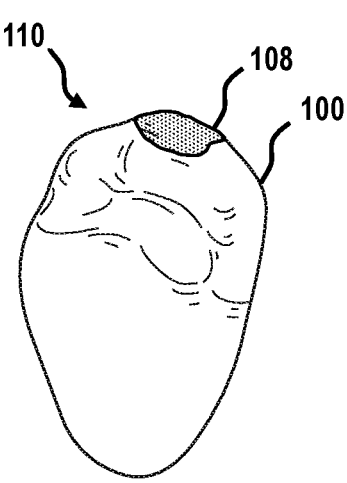
FIG. 6 shows an exemplary augmented reality view on the physical dental element of FIG. 1.

FIG. 6 shows another exemplary augmented reality view on the physical dental element of FIG. 1. Here, the section 108 is part of the three-dimensional digital dental element 104 extending beyond the detected geometric form of the physical dental element 100. In the example of FIG. 6, the augmented reality view is only augmented with the section 108 of the three-dimensional digital dental element extending beyond the detected geometric form of the physical dental element 100. Thus, it is illustrated, how the physical dental element 100 has to be extended I order to match the geometric target form defined by the three-dimensional digital dental element 104 for the physical dental element 100. The physical dental element 100 may be adjusted, e.g., dental material may be added at the position and in the form defined by section 108.

Figure 7:
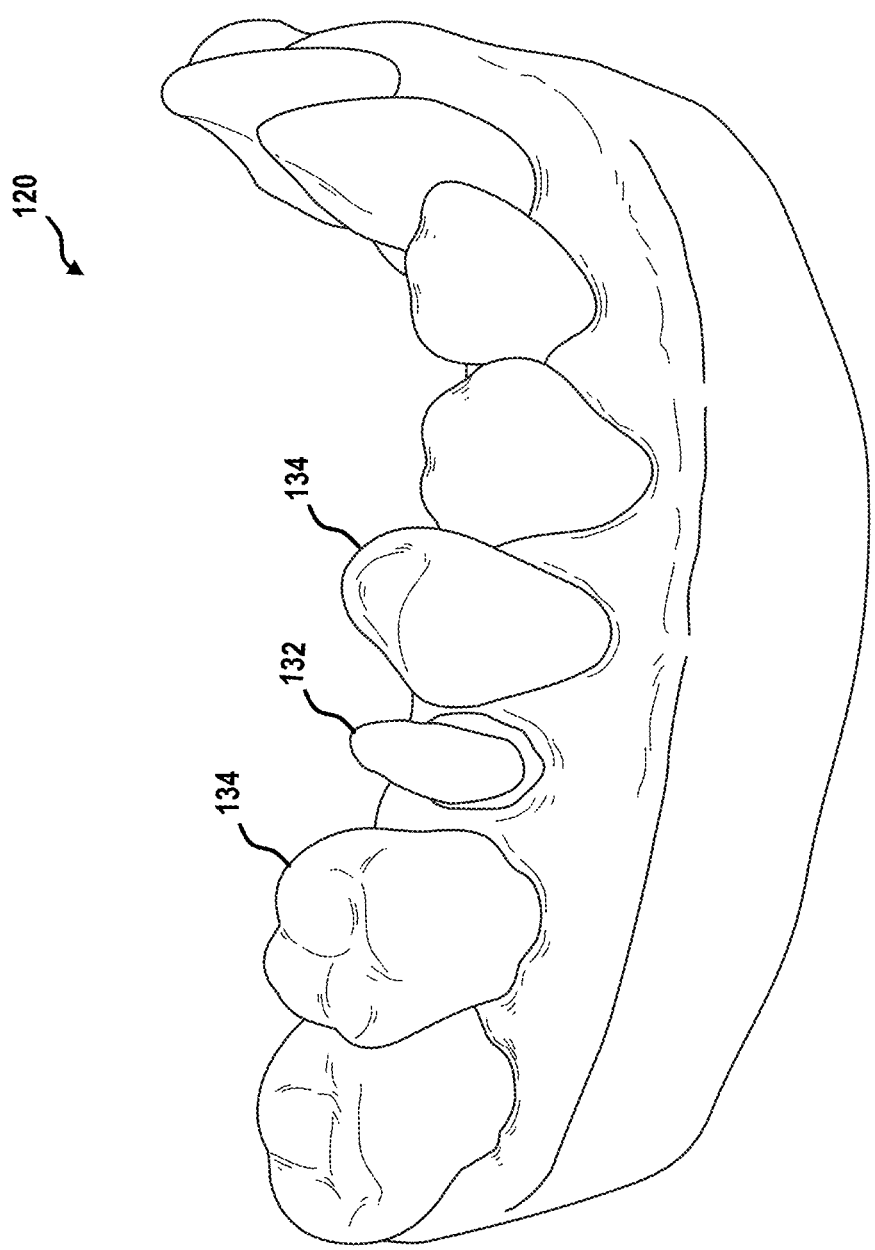
FIG. 7 shows an exemplary physical dentition model.
Figure 8:
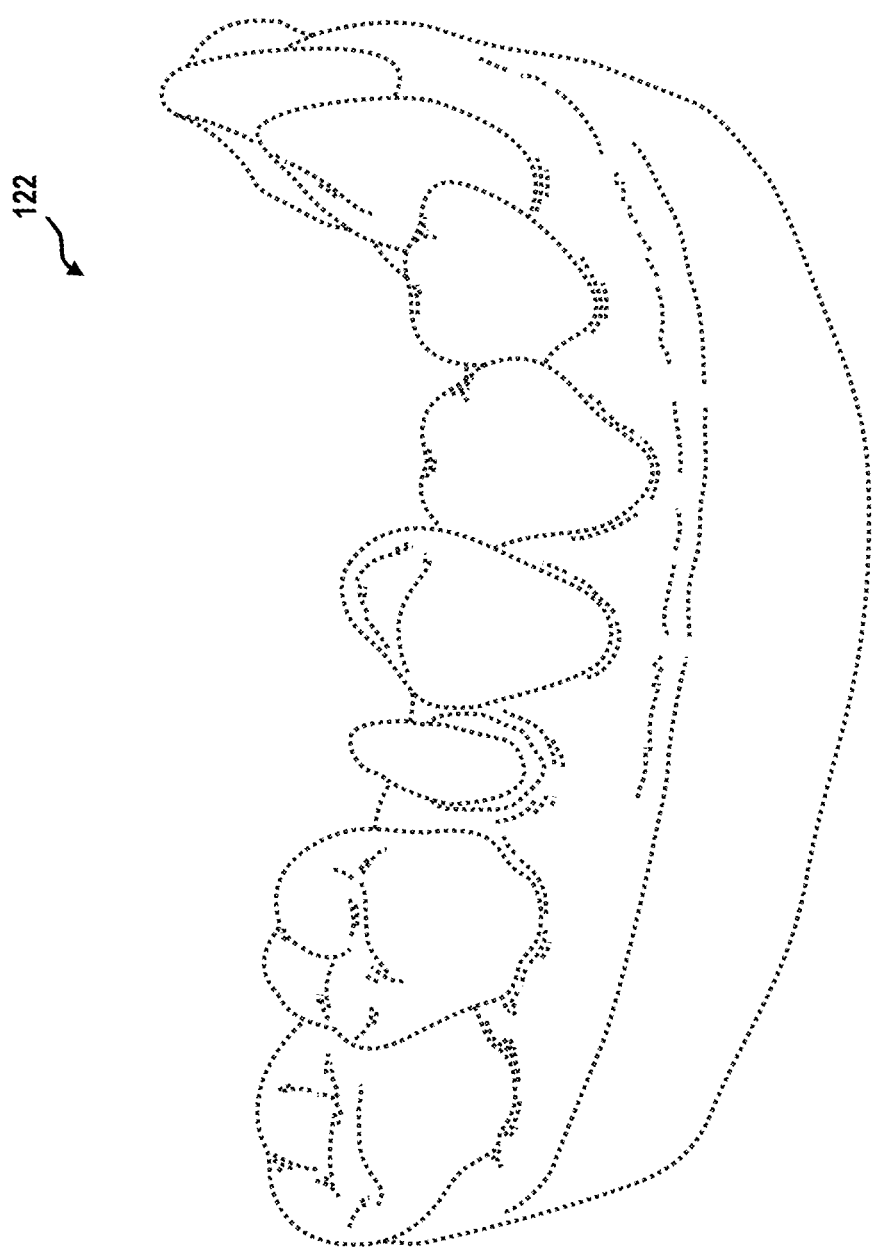
FIG. 8 shows an exemplary three-dimensional structural digital structural model configured for detecting the physical dentition model of FIG. 7.

FIG. 7 shows an exemplary physical dentition model 120, e.g., of a mandibular dental arch of a patient. The physical dentition model 120 comprises a prepared tooth 132, on which a physical dental element 100 in form of a crown is to be arranged. The space available for the physical dental element 100 is, e.g., limited by two neighboring teeth 134, which are arranged in distal and mesial direction relative to the prepared tooth 132. FIG. 8 shows an exemplary three-dimensional structural digital structural model 122 configured for detecting the physical dentition model 120 of FIG. 7.

Figure 9:
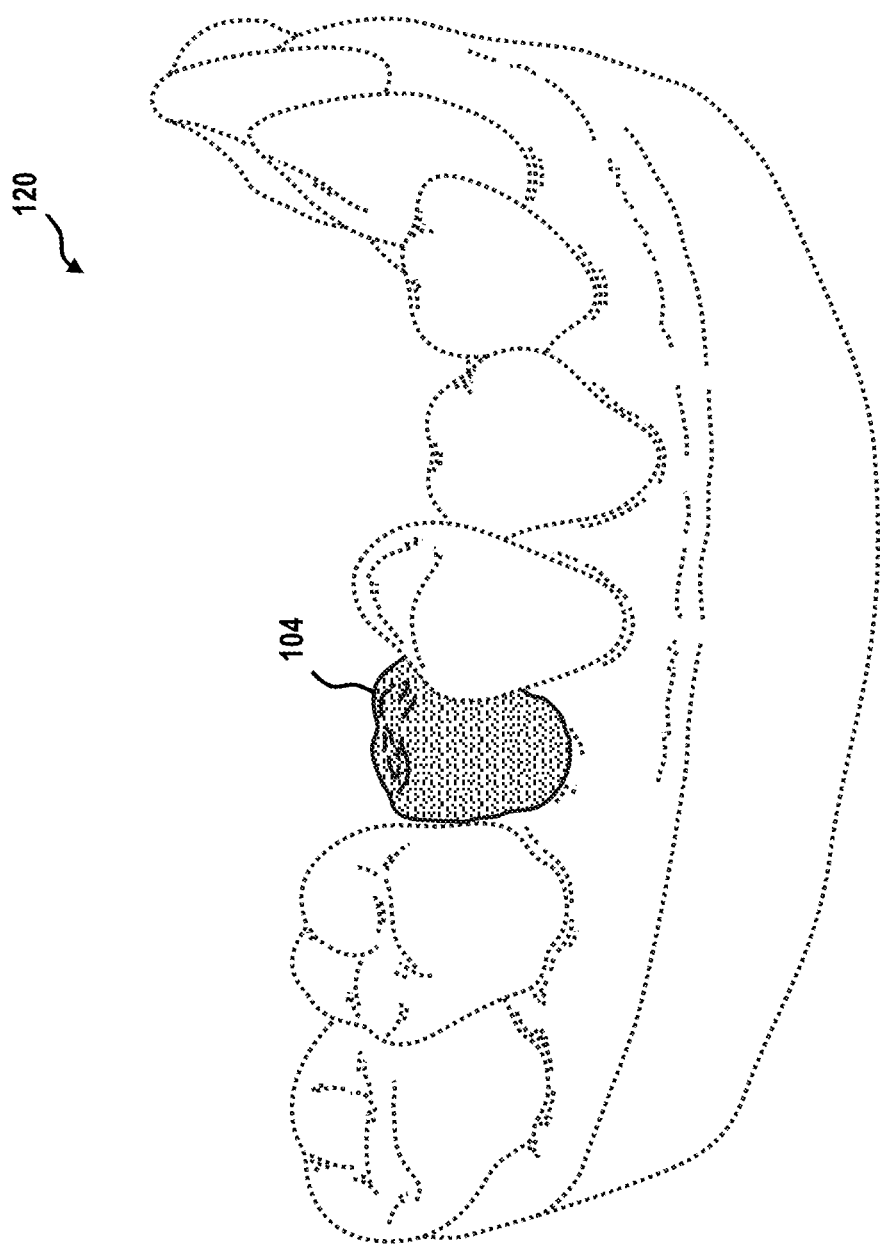
FIG. 9 shows the exemplary three-dimensional structural digital structural model of FIG. 8 with a three-dimensional digital template of a tooth to be added to the dentition.

The structural model 122 defines structural elements to be detected in optical imaging data of the physical dentition model 120 of FIG. 7 as well as their spatial relations to each other. The structural model 122 in FIG. 8 is a contour model defining contour lines of the physical dentition model 120 of FIG. 7. The structural model 122 of FIG. 8 may, e.g., be generated using a three-dimensional digital model of the mandibular dental arch of the patient. Alternatively, a structural model 122 may be provided, which only defines contour lines and/or contour points of parts of the physical dentition model 120 of FIG. 7. By detecting the structural elements defined by the structural model 122, the physical dentition model 120 may be detected within optical imaging data acquired by an optical sensor device, e.g., a camera. For example, position, orientation, and size of the physical dental element 100 within the optical imaging data may be determined. FIG. 9 shows the exemplary three-dimensional structural digital structural model 122 of FIG. 8 with a three-dimensional digital element 104, which is a three-dimensional digital template of the physical dental element 100 in form of a crown to be arranged on the prepared tooth 132. The prepared tooth 132 defines a target position of the three-dimensional digital element 104 relative to the three-dimensional structural digital structural model 122, at which the three-dimensional digital element 104 is arranged.

Figure 10:
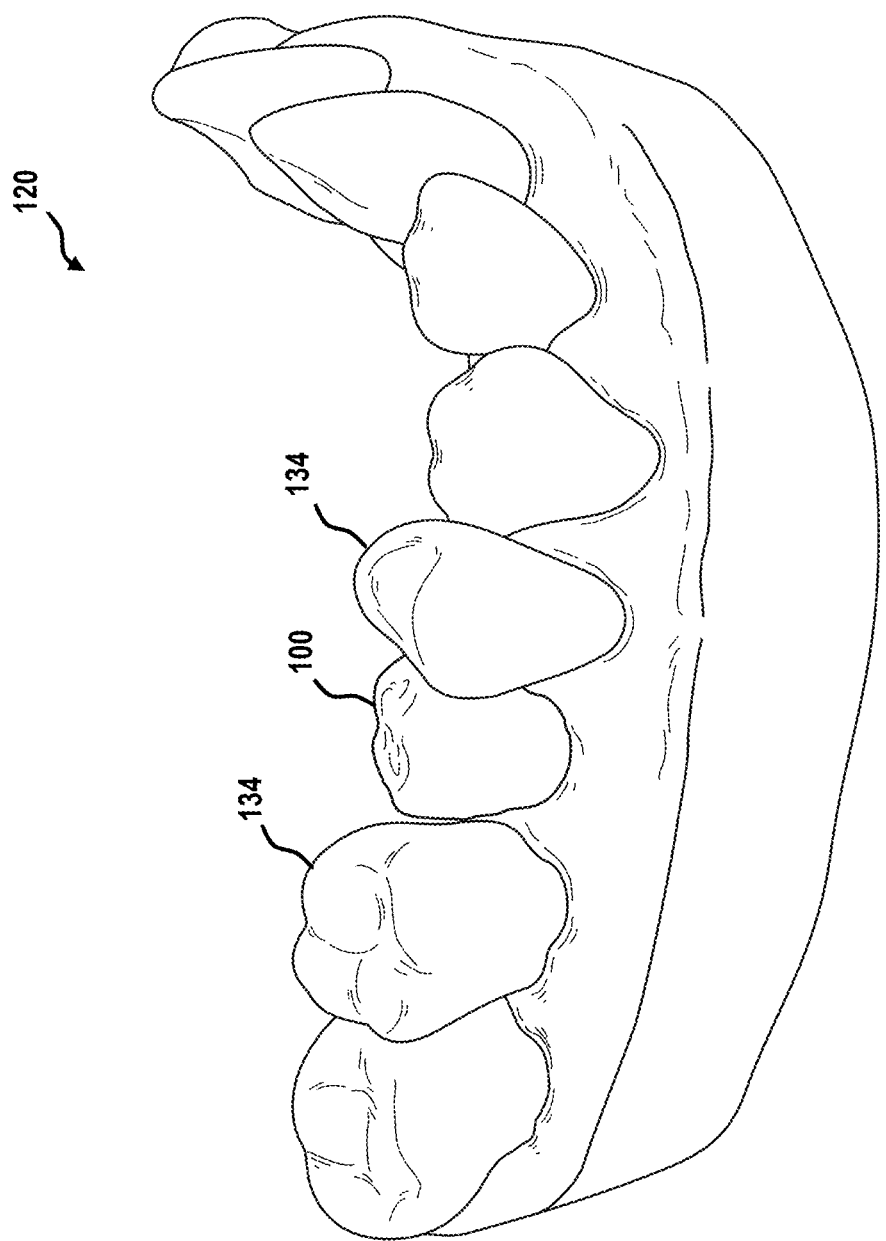
FIG. 10 shows the exemplary physical dentition model of FIG. 7 with a physical tooth model added.
Figure 11:
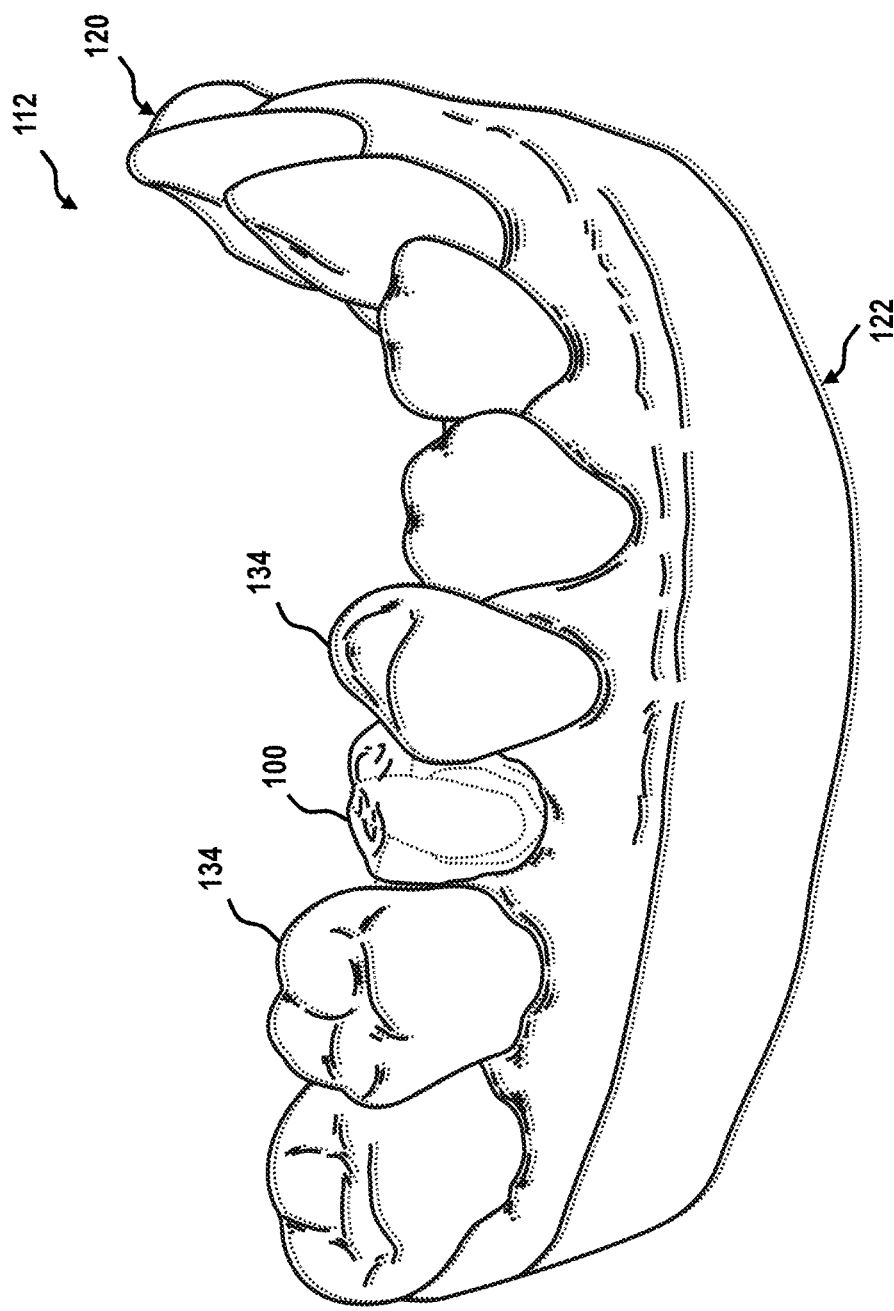
FIG. 11 shows an exemplary image of the physical dentition model of FIG. 7 with the three-dimensional structural digital structural model of FIG. 8.

FIG. 10 shows the exemplary physical dentition model 120 of FIG. 7 with the physical dental element 100 in form of the crown arranged on the prepared tooth 132. FIG. 11 shows an exemplary image 112 of the physical dentition model 120 of FIG. 7 with the three-dimensional structural digital structural model 122 of FIG. 8 used to detect the physical dentition model 120 within the optical imaging data 112. The position, orientation and/or size of the three-dimensional structural digital structural model 122 may, e.g., adjusted until the three-dimensional structural digital structural model 122, i.e., the structural elements defined by the three-dimensional structural digital structural model 122, matches a structure within the optical imaging data 112, i.e., structural elements comprised by the optical imaging data 112, which is the identified as the physical dentition model 120, i.e., the structural elements of the physical dentition model 120 to be detected.

Figure 12:
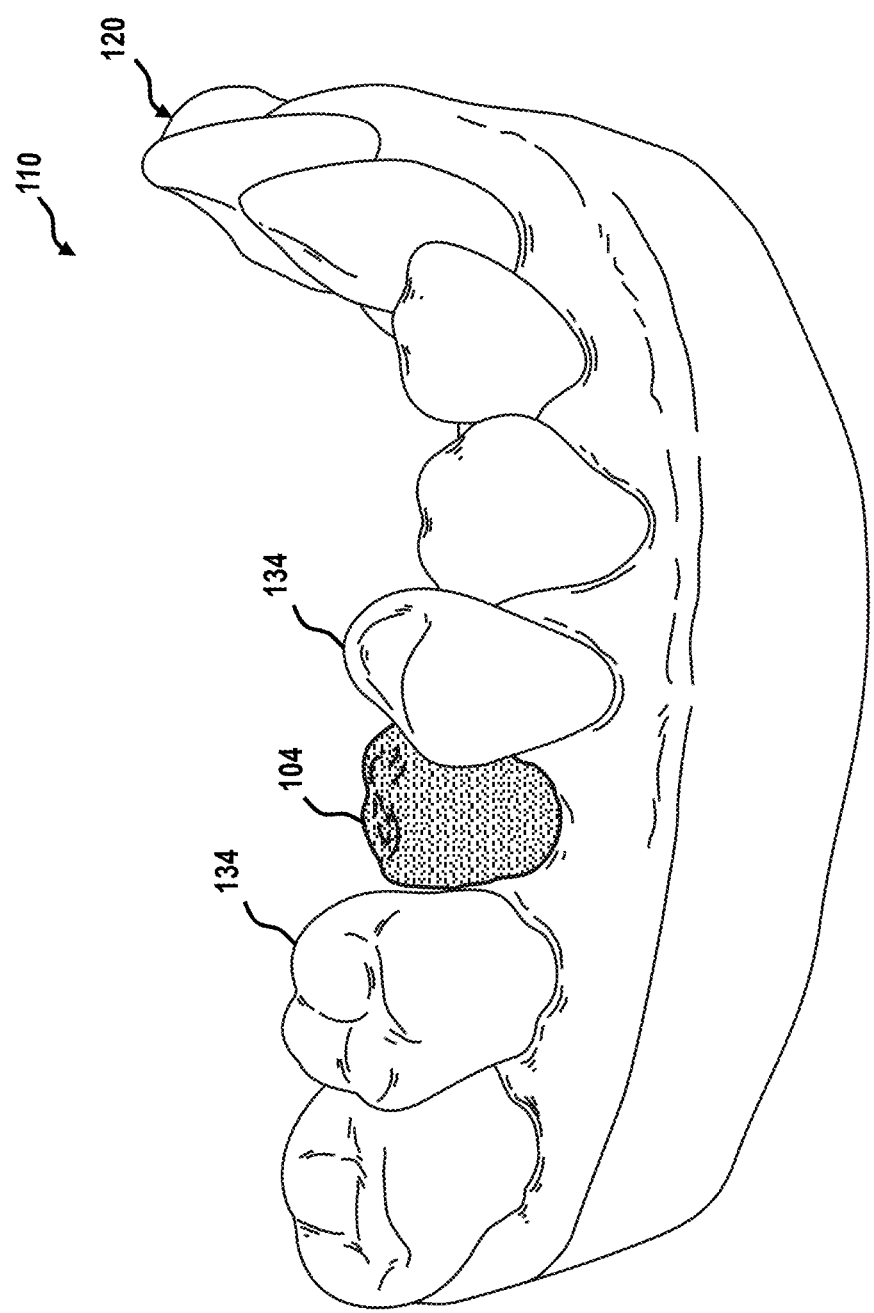
FIG. 12 shows an exemplary augmented reality view on the physical dentition model of FIG. 7 augmented with the three-dimensional digital template of a tooth.
Figure 13:
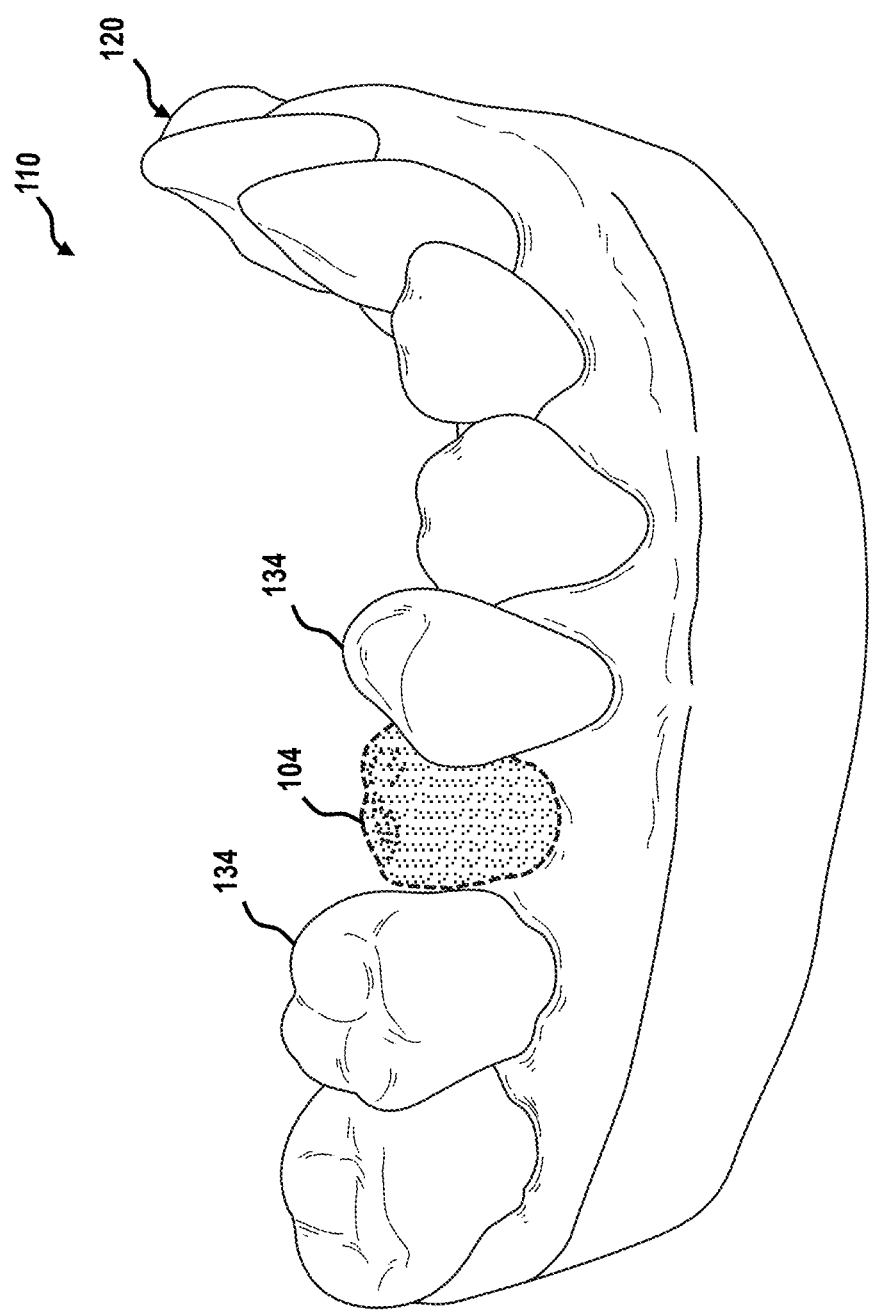
FIG. 13 shows an exemplary augmented reality view on the physical dentition model of FIG. 7 augmented with the three-dimensional digital template of a tooth.

FIG. 12 shows an exemplary augmented reality view 110 on the physical dentition model 120 of FIG. 7 augmented with the three-dimensional digital element 104 of FIG. 9. The three-dimensional digital element 104 illustrates a geometric target form and/or target position for the physical dental element 100 arranged within the physical dentition model 120. Thus, the geometric form and/or the position may be effectively checked, whether they comply with the geometric target form and/or target position defined by the augmented three-dimensional digital element 104. A user may visually check the geometric form and/or the position of the physical dental element 100 arranged within the physical dentition model 120. FIG. 13 shows an exemplary augmented reality view 110 on the physical dentition model 120 of FIG. 7 augmented with the three-dimensional digital element 104 of FIG. 9. The augmented reality view 110 shown in FIG. 13 is the same augmented reality view 110 as the one shown in FIG. 12, with the only difference, that a degree of translucency of the displayed three-dimensional digital dental element 104 is increased. Increasing the degree of translucency may, e.g., enable a user to better see the physical dental element 100 within the augmented reality view 110. For example, the degree of translucency may be increased, when the user wants to adjust the physical dental element 100, and reduced, when the user wants to check the result of the adjustment using the three-dimensional digital element 104.

Figure 14:
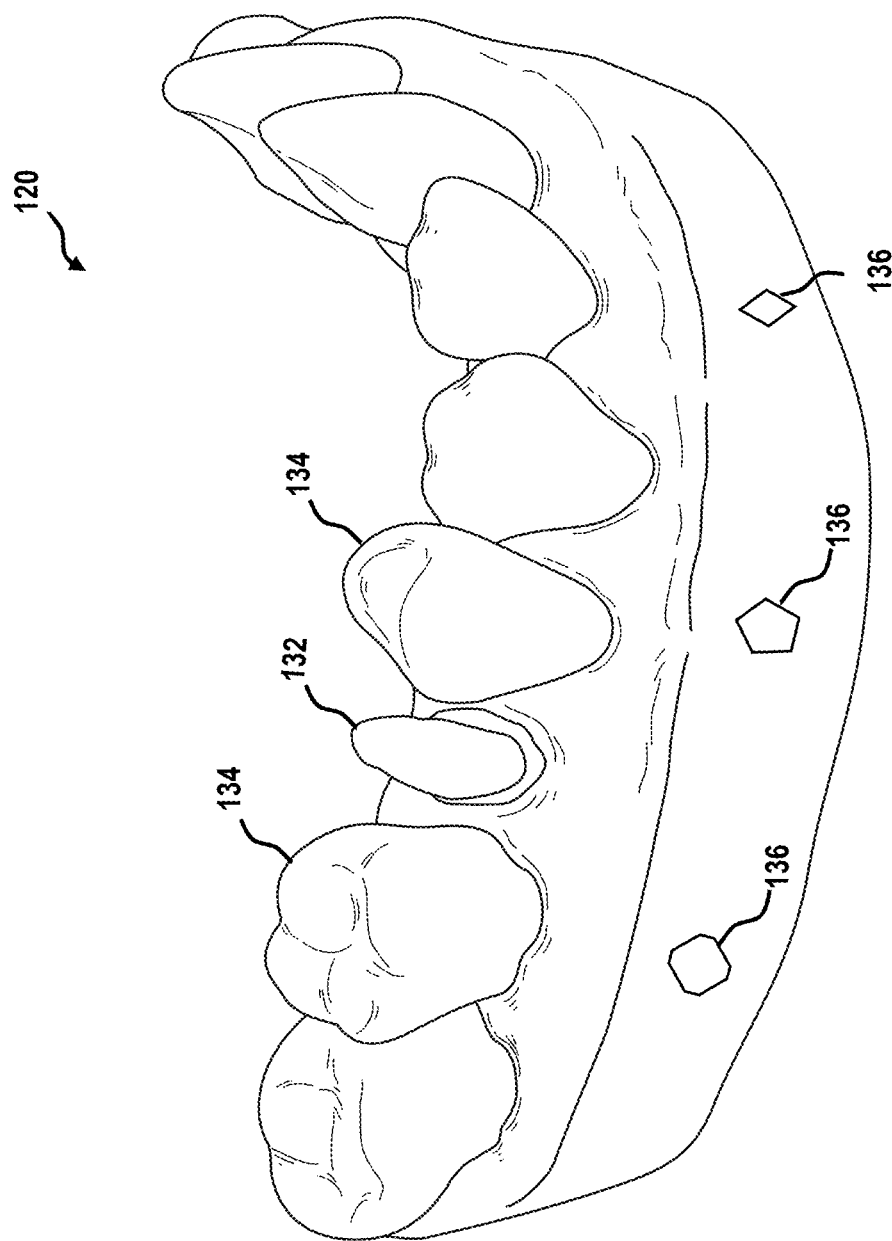
FIG. 14 shows an exemplary physical dentition model with markers added.

FIG. 14 shows an exemplary physical dentition model 120, e.g., of a mandibular dental arch of a patient. The exemplary physical dentition model 120 of FIG. 14, e.g., corresponds to the exemplary physical dentition model 120 of FIG. 7. In addition, physical dentition model 120 comprises markers 136. These markers 136 are, e.g., non-anatomical structural elements and may be used as the structural elements to be detected within optical imaging data of the physical dentition model 120. By detecting theses structural elements, i.e., the markers 136, e.g., the exemplary physical dentition model 120 may be detected within the optical imaging data.

Figure 15:
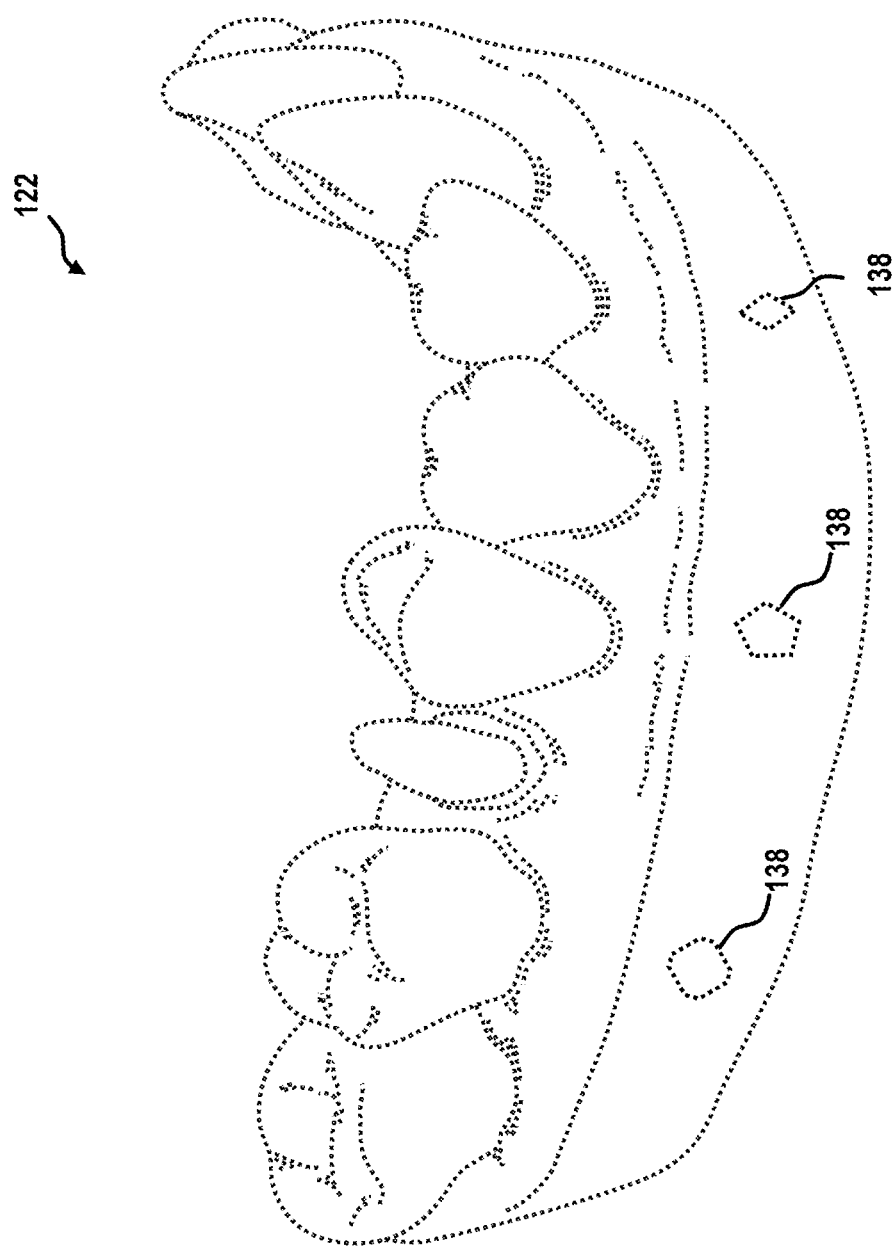
FIG. 15 shows an exemplary three-dimensional structural digital structural model with markers configured for detecting the physical dentition model of FIG. 14.

FIG. 15 shows an exemplary three-dimensional structural digital structural model 122 configured for detecting the physical dentition model 120 of FIG. 14. The exemplary three-dimensional structural digital structural model 122 of FIG. 15 may, e.g., correspond to the three-dimensional structural digital structural model 122 of FIG. 8 with the digital markers 138 added. Position and form of the digital marker 138 of the three-dimensional structural digital structural model 122 of FIG. 15 correspond to position and form of the physical marker 136 of the exemplary physical dentition model 120 of FIG. 14. Thus, by matching the digital marker 138 to the physical marker 136 in an optical image of the three-dimensional structural digital structural model 122, the physical marker 136 and thus the three-dimensional structural digital structural model 122 may be detected within the optical imaging data.

Figure 16:
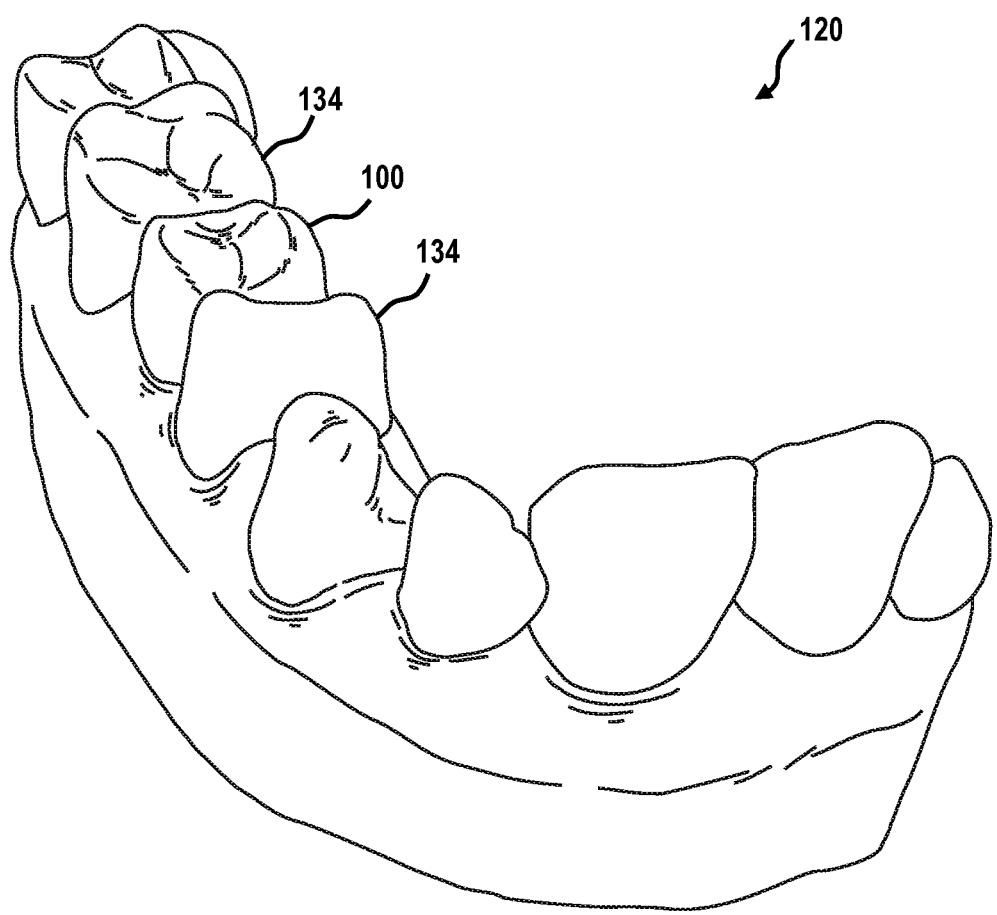
FIG. 16 shows an exemplary physical dentition model with a physical tooth model added.
Figure 17:
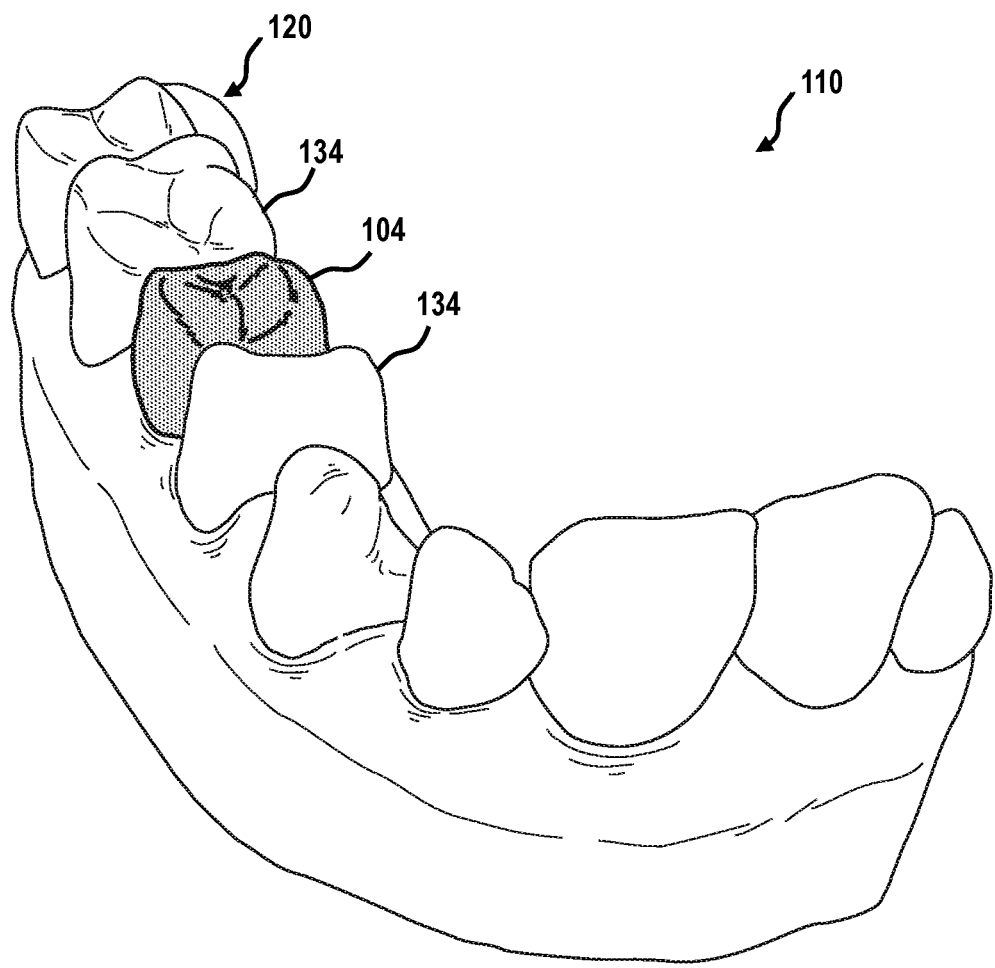
FIG. 17 shows an exemplary augmented reality view on the physical dentition model of FIG. 16 augmented with a three-dimensional digital template of a tooth.

FIG. 16 shows an exemplary physical dentition model 120, e.g., of a section of a mandibular dental arch of a patient. A physical dental element 100 in form of the crown is arranged between two neighboring teeth 134, which are arranged in distal and mesial direction relative to the physical dental element 100. The physical dental element 100 may, e.g., be arranged on a prepared tooth or on an abutment using an implant. FIG. 17 shows an exemplary augmented reality view 110 on the physical dentition model 120 of FIG. 16 augmented with a three-dimensional digital element 104. The three-dimensional digital element 104 is a three-dimensional digital template of the physical dental element 100 of FIG. 16. The three-dimensional digital element 104 illustrates a geometric target form and/or target position for the physical dental element 100 arranged within the physical dentition model 120. Thus, the geometric form and/or the position may be effectively checked, whether they comply with the geometric target form and/or target position defined by the augmented three-dimensional digital element 104. A user may visually check the geometric form and/or the position of the physical dental element 100 arranged within the physical dentition model 120.

Figure 18:
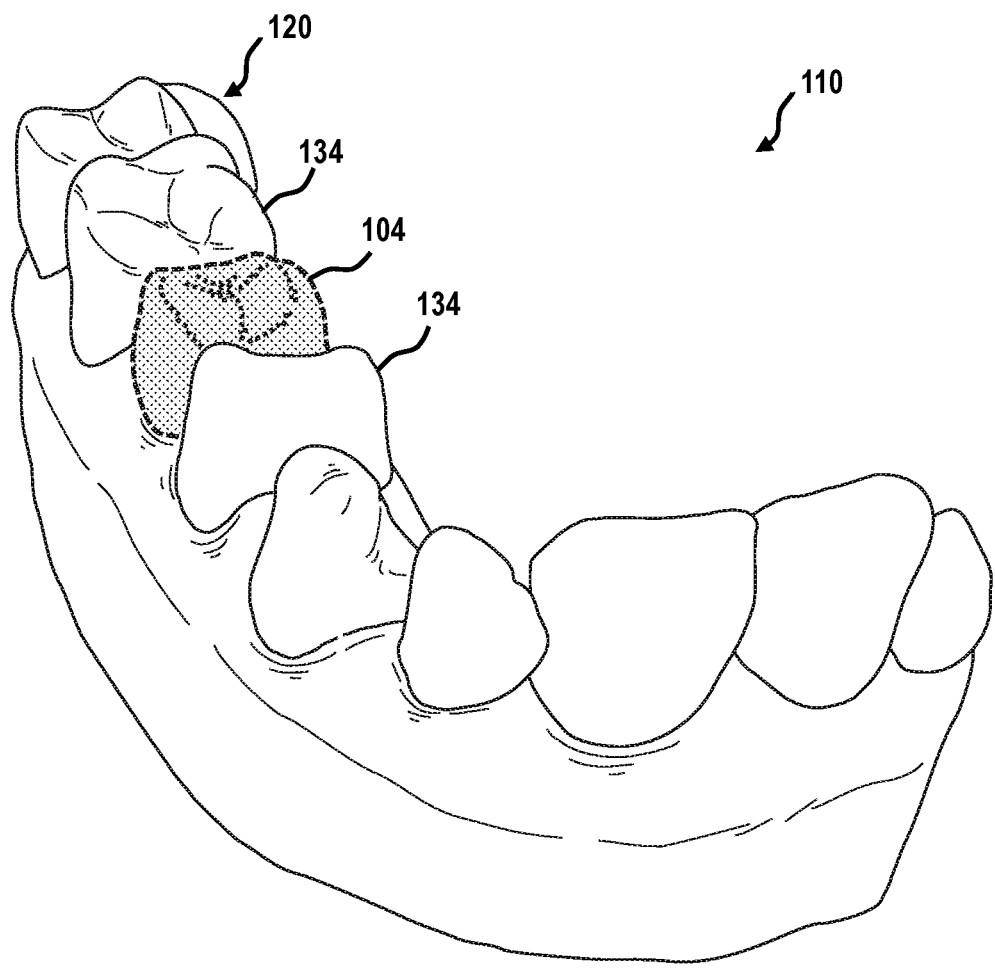
FIG. 18 shows an exemplary augmented reality view on the physical dentition model of FIG. 16 augmented with a three-dimensional digital template of a tooth.

FIG. 18 shows an exemplary augmented reality view 110 on the physical dentition model 120 of FIG. 16 augmented with a three-dimensional digital element 104, which is a three-dimensional digital template of the physical dental element 100 of FIG. 16. The augmented reality view 110 shown in FIG. 18 is the same augmented reality view 110 as the one shown in FIG. 17, with the only difference, that a degree of translucency of the displayed three-dimensional digital dental element 104 is increased. Increasing the degree of translucency may, e.g., enable a user to better see the physical dental element 100 within the augmented reality view 110. For example, the degree of translucency may be increased, when the user wants to adjust the physical dental element 100, and reduced, when the user wants to check the result of the adjustment using the three-dimensional digital element 104.

Figure 19:
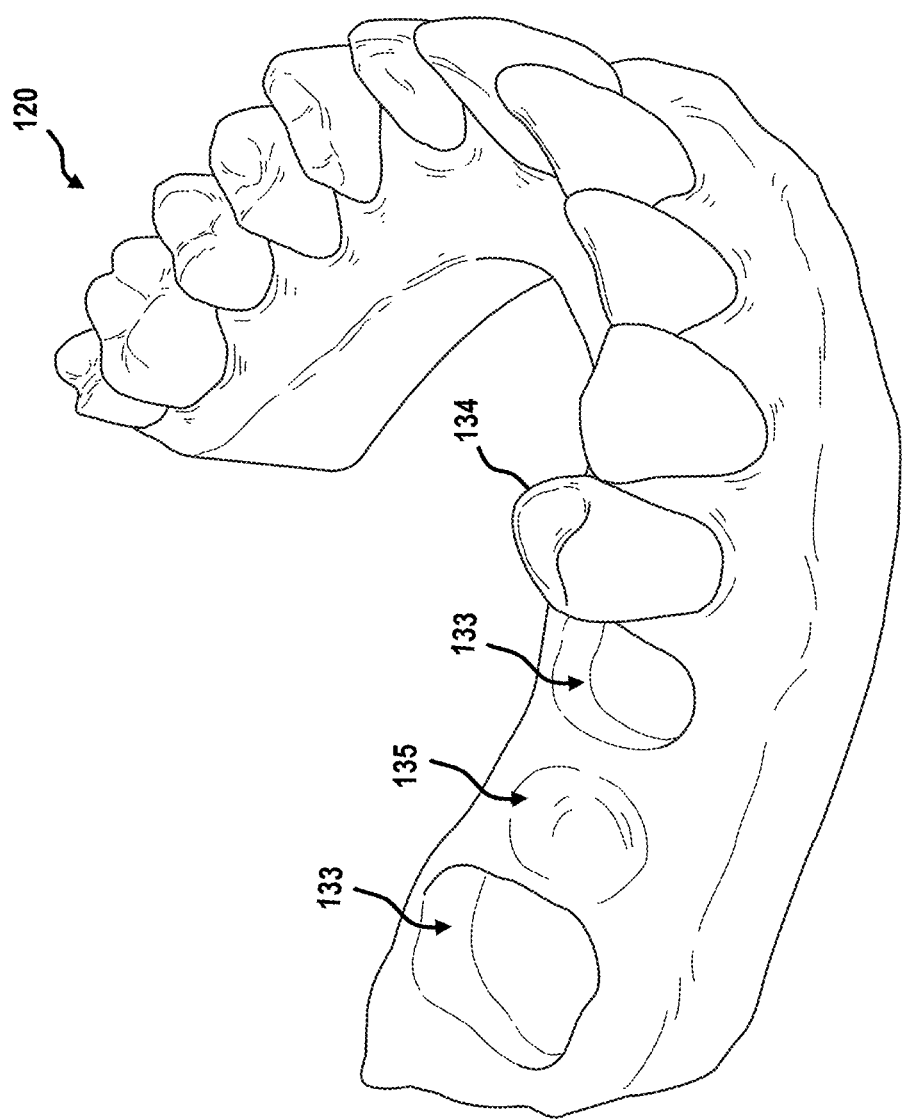
FIG. 19 shows an exemplary physical dentition model with receptions for a bridge.

FIG. 19 shows an exemplary physical dentition model 120, e.g., of a section of a mandibular dental arch of a patient. The physical dentition model 120 comprises two receptions 133 configured for receiving teeth of a physical dental element in form of a bridge. The bridge is to be arranged in distal direction next to the neighboring tooth 134. The physical dental element in form of the bridge may, e.g., comprise three teeth. Two of the three teeth may be arranged at the positions defined by the receptions 133, will a third tooth is to be arranged between these two teeth at the position 135.

Figure 20:
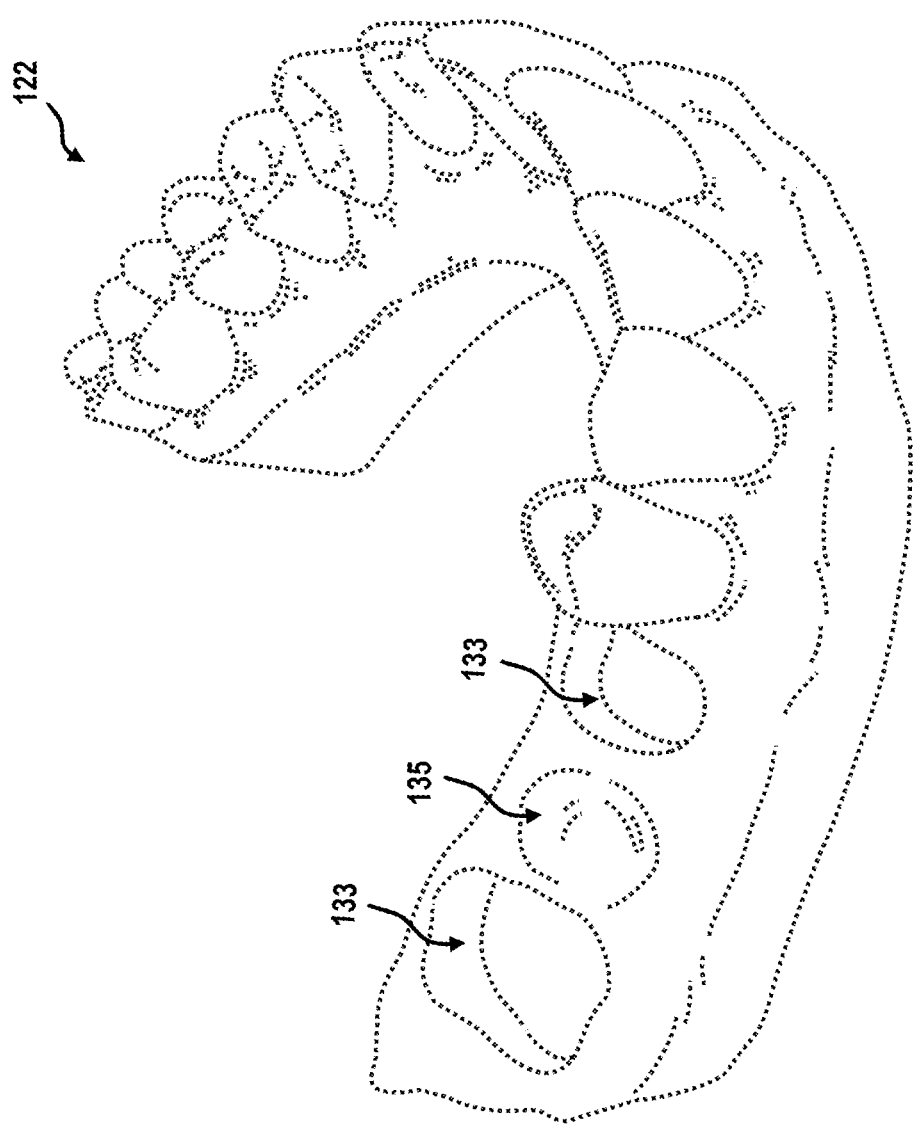
FIG. 20 shows an exemplary three-dimensional structural digital structural model configured for detecting the physical dentition model of FIG. 19.

FIG. 20 shows an exemplary three-dimensional structural digital structural model 122 configured for detecting the physical dentition model 120 of FIG. 19. The structural model 122 defines structural elements to be detected in optical imaging data of the physical dentition model 120 of FIG. 19 as well as their spatial relations to each other. The structural model 122 in FIG. 20 is a contour model defining contour lines of the physical dentition model 120 of FIG. 19. The structural model 122 of FIG. 20 may, e.g., be generated using a three-dimensional digital model of the mandibular dental arch of the patient. Alternatively, a structural model 122 may be provided, which only defines contour lines and/or contour points of parts of the physical dentition model 120 of FIG. 19. By detecting the structural elements defined by the structural model 122, the physical dentition model 120 may be detected within optical imaging data acquired by an optical sensor device, e.g., a camera.

Figure 21:
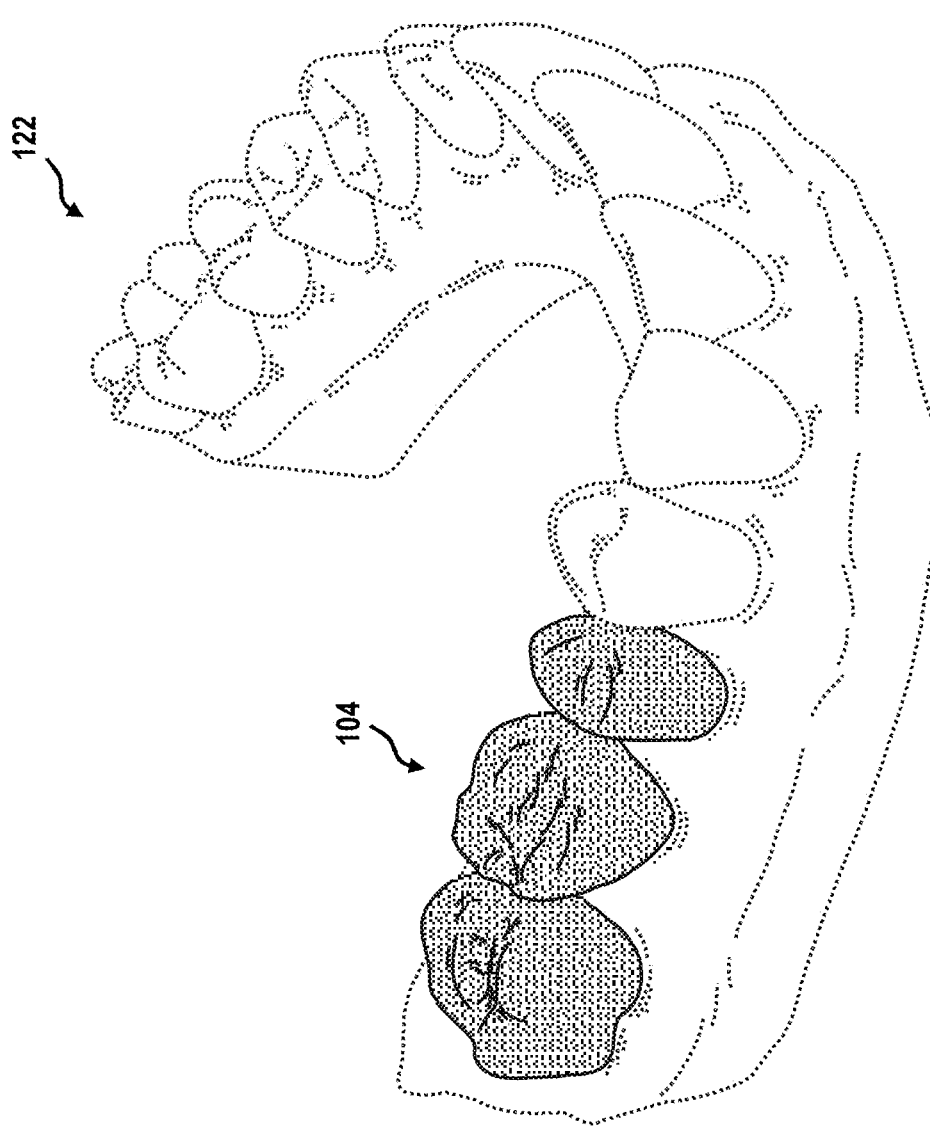
FIG. 21 shows the exemplary three-dimensional structural digital structural model of FIG. 19 with a three-dimensional digital template of a bridge to be added to the dentition.

FIG. 21 shows the exemplary three-dimensional structural digital structural model 122 of FIG. 19 with a three-dimensional digital element 104, which is a three-dimensional digital template of the physical dental element in form of a bridge to be arranged next to the neighboring tooth 134 within the receptions 133. The receptions 133 define a target position of the three-dimensional digital element 104 relative to the three-dimensional structural digital structural model 122, at which the three-dimensional digital element 104 is arranged.

Figure 22:
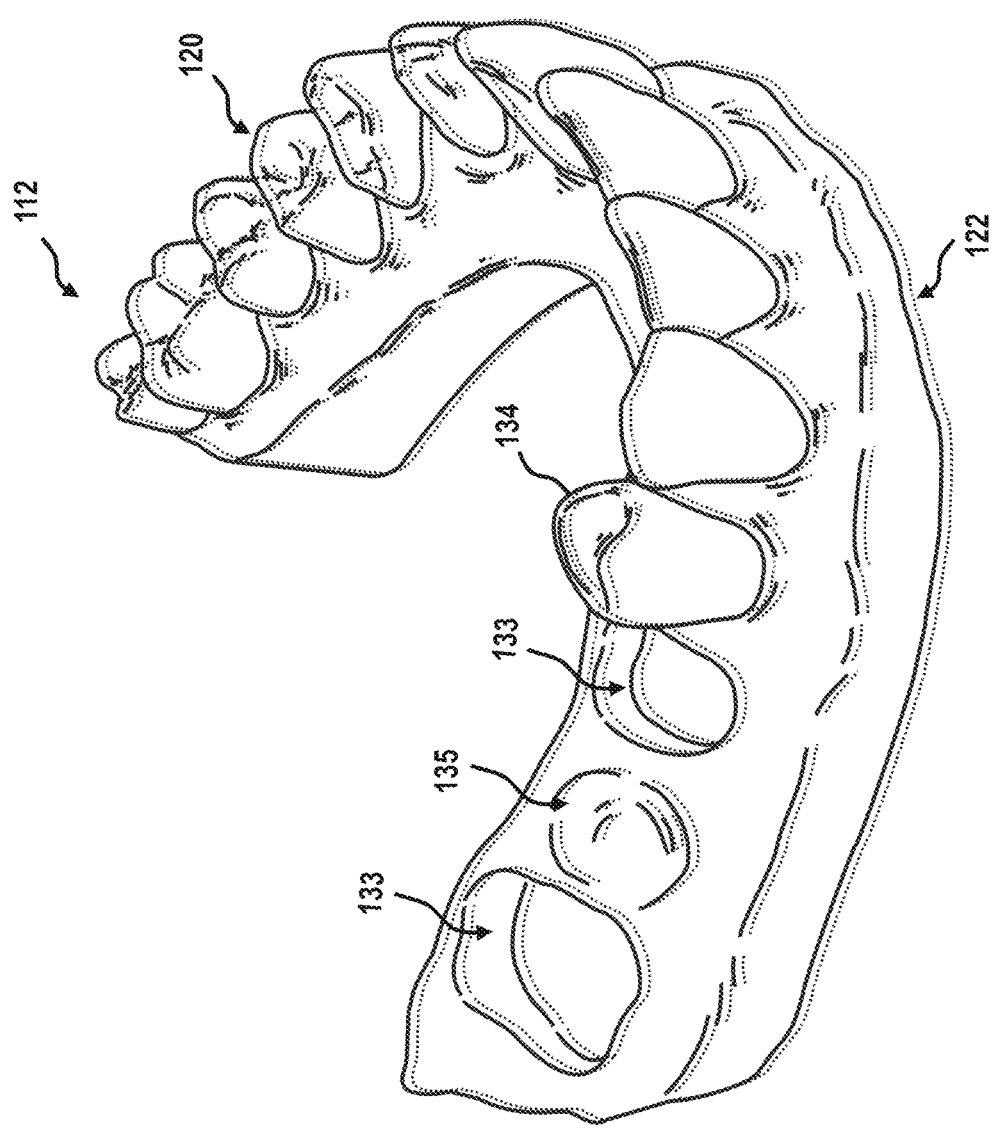
FIG. 22 shows an exemplary image of the physical dentition model of FIG. 19 with the three-dimensional structural digital structural model of FIG. 21.

FIG. 22 shows an exemplary image of the physical dentition model 120 of FIG. 19 with the three-dimensional structural digital structural model 122 of FIG. 21 used to detect the physical dentition model 120 within the optical imaging data 112. The position, orientation and/or size of the three-dimensional structural digital structural model 122 may, e.g., adjusted until the three-dimensional structural digital structural model 122, i.e., the structural elements defined by the three-dimensional structural digital structural model 122, matches a structure within the optical imaging data 112, i.e., structural elements comprised by the optical imaging data 112, which is the identified as the physical dentition model 120, i.e., the structural elements of the physical dentition model 120 to be detected.

Figure 23:
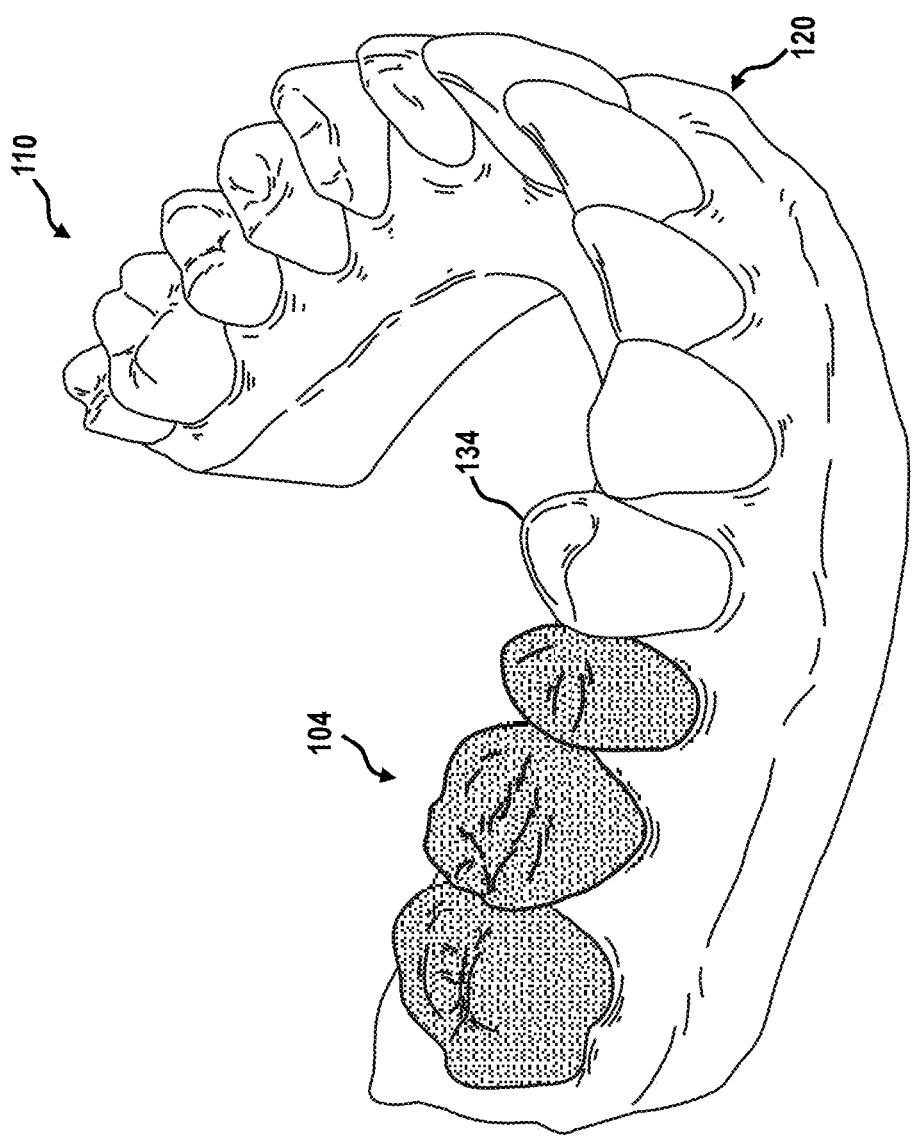
FIG. 23 shows an exemplary augmented reality view on the physical dentition model of FIG. 19 augmented with the three-dimensional digital template of the bridge.

FIG. 23 shows an exemplary augmented reality view 110 on the physical dentition model 120 of FIG. 19 augmented with the three-dimensional digital element 104 of FIG. 21 in form of a bridge. The three-dimensional digital element 104 illustrates a geometric target form and/or target position for the physical dental element 100 arranged within the physical dentition model 120. Thus, the geometric form and/or the position may be effectively checked, whether they comply with the geometric target form and/or target position defined by the augmented three-dimensional digital element 104. A user may visually check the geometric form and/or the position of the physical dental element 100 arranged within the physical dentition model 120.

Figure 24:
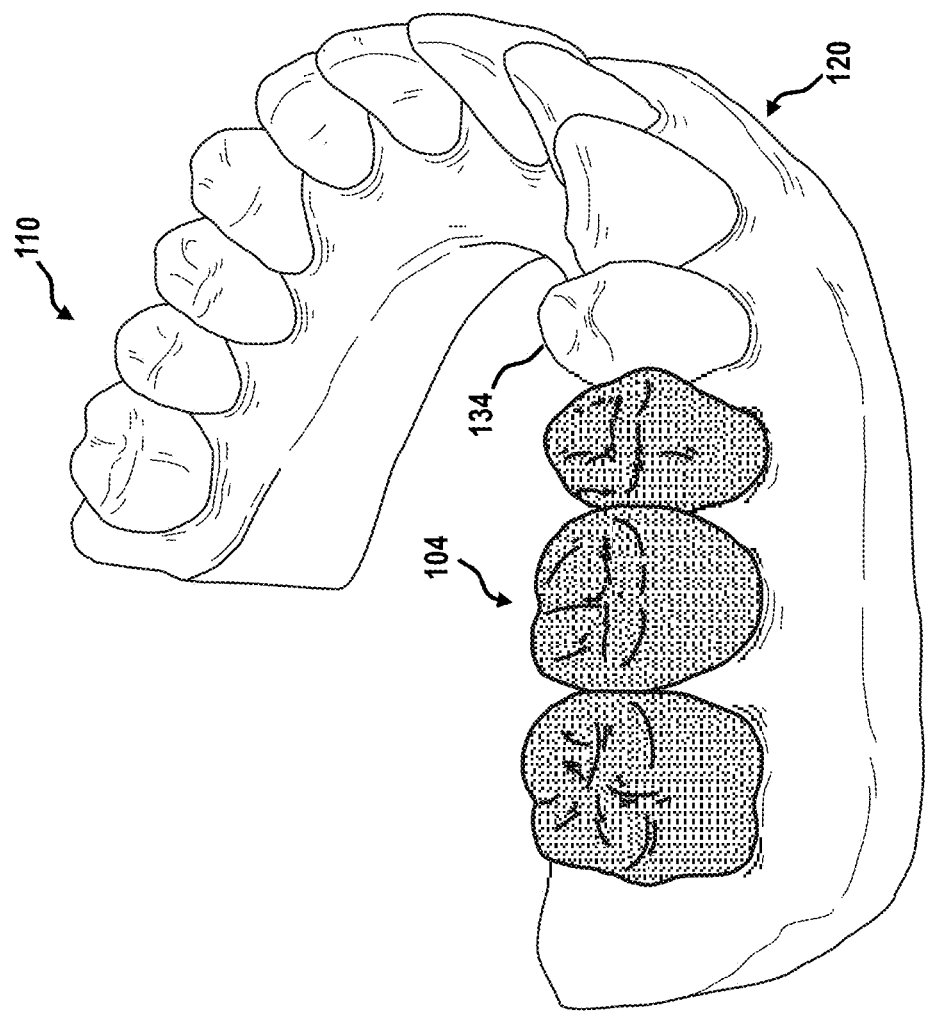
FIG. 24 shows an exemplary augmented reality view on the physical dentition model of FIG. 19 augmented with the three-dimensional digital template of the bridge.

FIG. 24 an exemplary augmented reality view 110 on the physical dentition model 120 of FIG. 19 augmented with the three-dimensional digital element 104 of FIG. 21 in form of a bridge. The augmented reality view 110 of FIG. 24 show the same physical dentition model 120 as the augmented reality view 110 of FIG. 23, only from a different point of view. Thus, a user may move and/or turn the physical dentition model 120, while being provided with an augmented reality view 110 on the physical dentition model 120. The use may examine the physical dentition model 120 from different direction, while the augmented reality view 110 is augmented with the three-dimensional digital element 104, the position and/or orientation of which are updated in real time. Thus, a user may have the impression, that the augmented three-dimensional digital element 104 moves and/or turns together with the physical dentition model 120.

Figure 25:
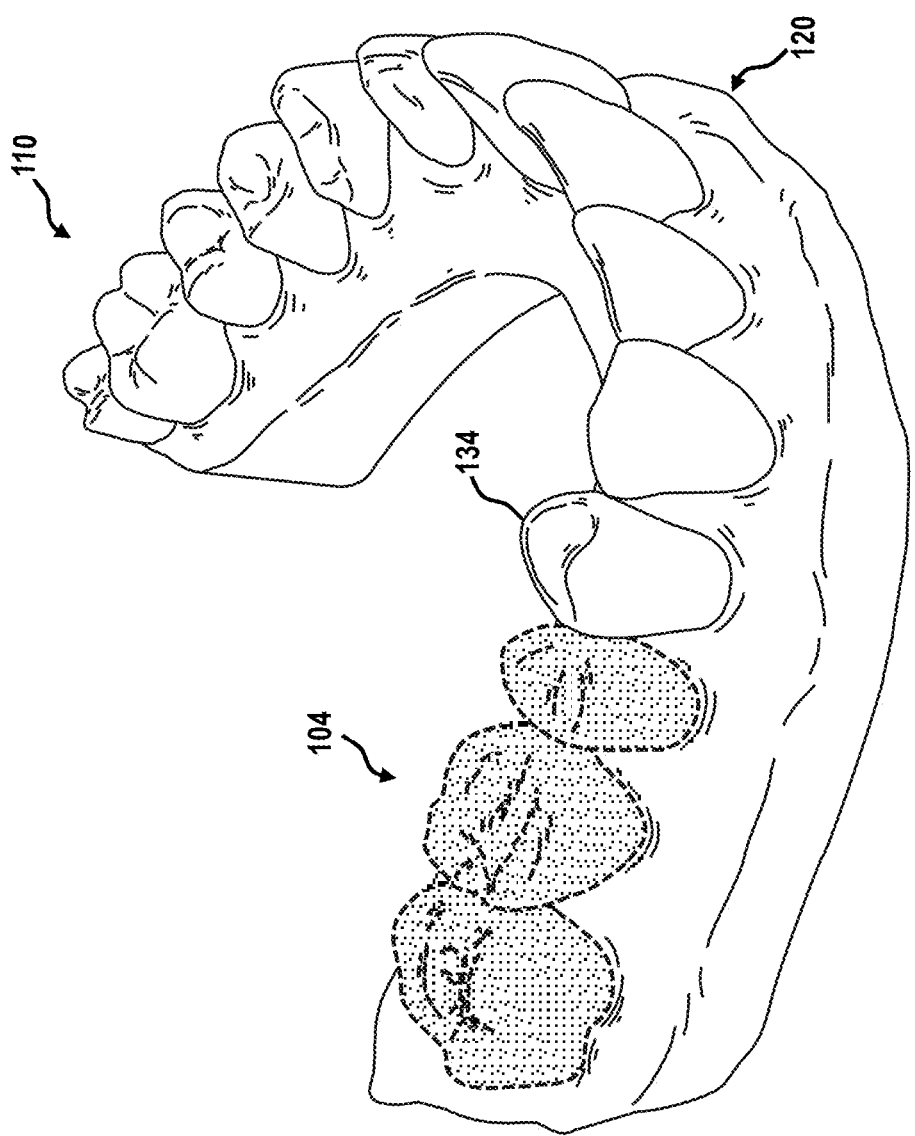
FIG. 25 shows an exemplary augmented reality view on the physical dentition model of FIG. 19 augmented with the three-dimensional digital template of the bridge.

FIG. 25 shows an exemplary augmented reality view 110 on the physical dentition model 120 of FIG. 19 augmented with the three-dimensional digital element 104 of FIG. 21 in form of a bridge. The augmented reality view 110 shown in FIG. 15 is the same augmented reality view 110 as the one shown in FIG. 13, with the only difference, that a degree of translucency of the displayed three-dimensional digital dental element 104 is increased. Increasing the degree of translucency may, e.g., enable a user to better see the physical dental element 100 and/or structures underlying three-dimensional digital dental element 104 within the augmented reality view 110. For example, the degree of translucency may be increased, when the user wants to adjust the physical dental element 100, and reduced, when the user wants to check the result of the adjustment using the three-dimensional digital element 104.

Figure 26:
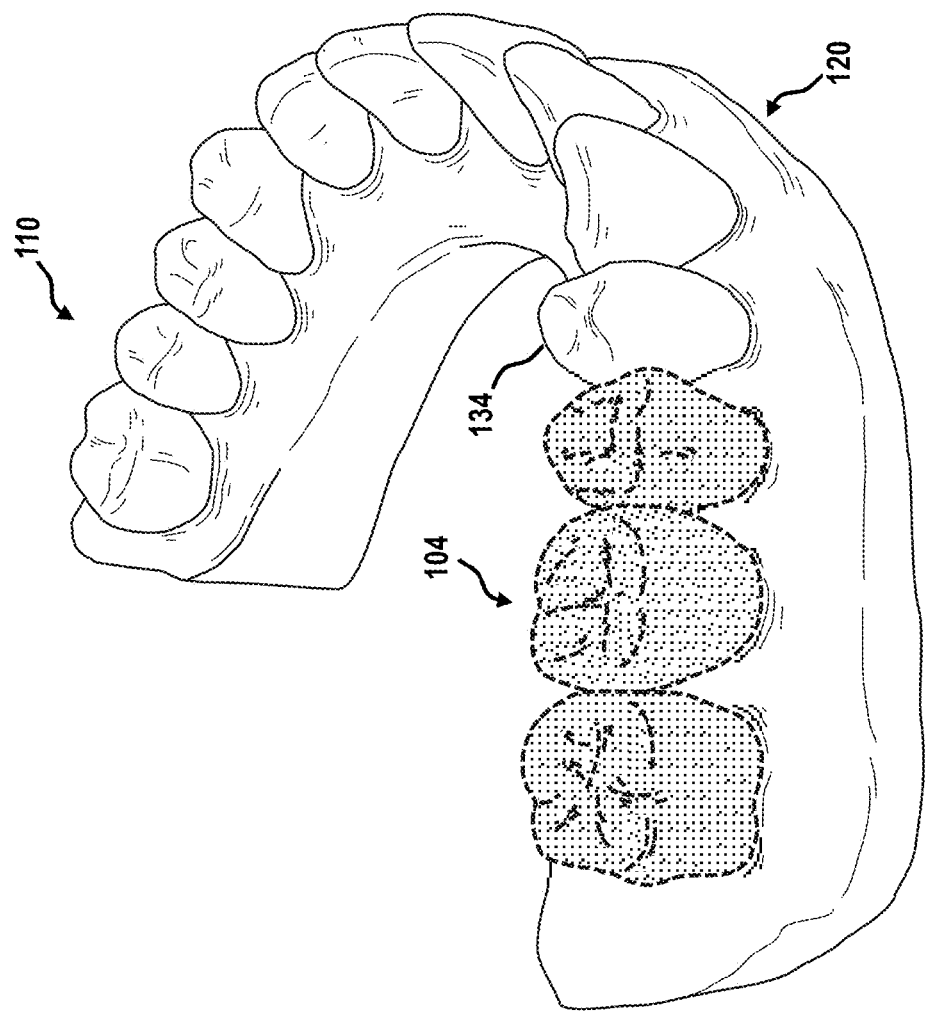
FIG. 26 shows an exemplary augmented reality view on the physical dentition model of FIG. 19 augmented with the three-dimensional digital template of the bridge.

FIG. 26 show an exemplary augmented reality view 110 on the physical dentition model 120 of FIG. 19 augmented with the three-dimensional digital element 104 of FIG. 21 in form of a bridge. The augmented reality view 110 of FIG. 26 show the same physical dentition model 120 as the augmented reality view 110 of FIG. 25, only from a different point of view. Thus, a user may move and/or turn the physical dentition model 120, while being provided with an augmented reality view 110 on the physical dentition model 120.

Figure 27:
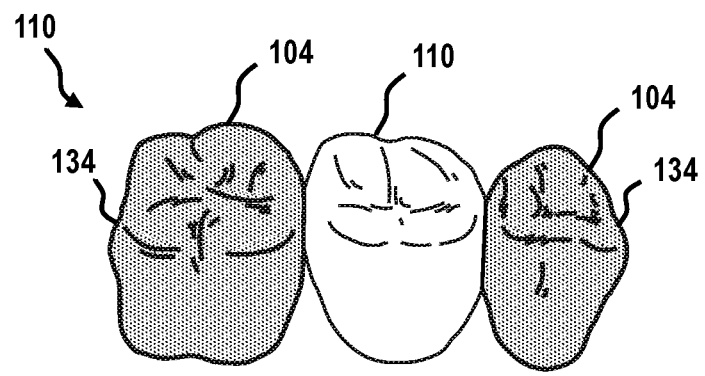
FIG. 27 shows an exemplary augmented reality view on a physical dental element 100 augmented with the three-dimensional digital models of neighboring teeth.
Figure 28:
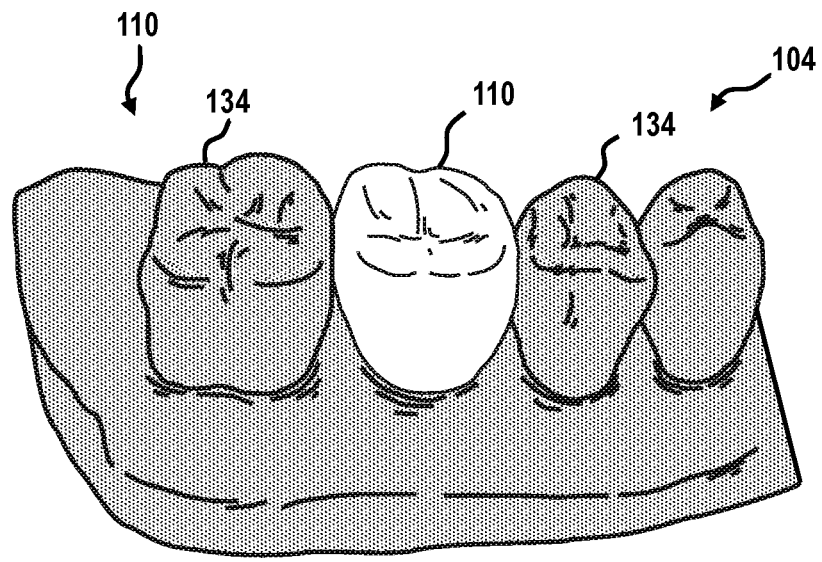
FIG. 28 shows an exemplary augmented reality view on a physical dental element 100 augmented with the three-dimensional digital models of neighboring teeth.

FIG. 27 shows an exemplary augmented reality view 110 on a physical dental element 100, e.g., in form of a crown, which is augmented with the three-dimensional digital model 104 of two neighboring teeth 134. The three-dimensional digital model 104 may comprise two teeth 134, between which the physical dental element 100 is to be arranged. The augmented reality view 110 on a physical dental element 100 with the three-dimensional digital model 104 of two neighboring teeth 134 may, e.g., be used to check the arrangement of the physical dental element 100 between the two neighboring teeth 134. For example, the two neighboring teeth 134 may define approximal limits for the geometric form of the physical dental element 100. Using the augmented reality view 110 of FIG. 27, a user may check visually, whether the geometric form of the physical dental element 100 complies with limits defined by the neighboring teeth 134. FIG. 28 shows an exemplary augmented reality view 110 on the physical dental element 100 of FIG. 27 augmented with a three-dimensional digital model 104 of a section of a dental arch of a patient. The dental arch may comprise the two neighboring teeth 134. In addition, the three-dimensional digital model 104 may comprise one or more additional teeth of the dental arch as well as a section of the gingiva of the dental arch, i.e., of the gingiva within which the teeth of the dental arch are arranged.

Figure 29:
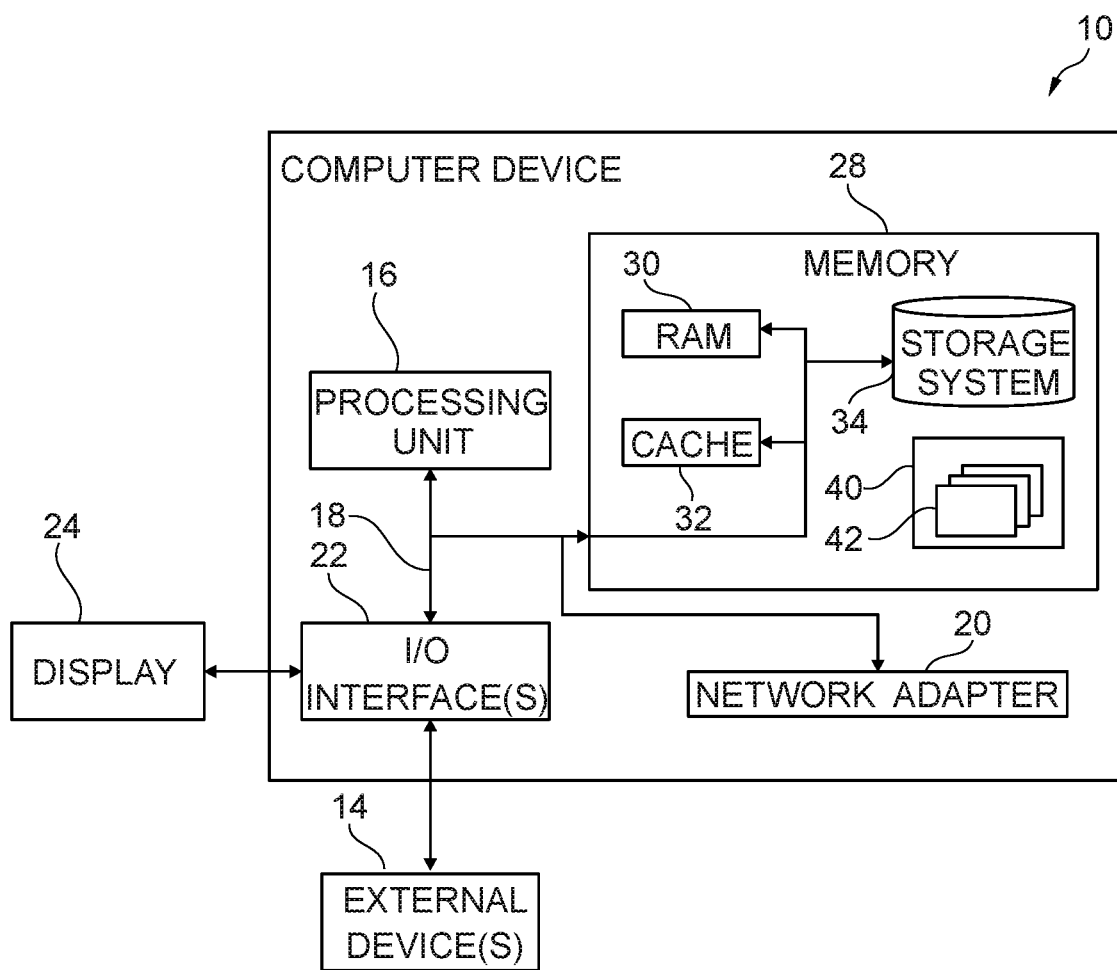
FIG. 29 shows an exemplary computer device for checking a geometric form of a physical dental element using motion tracking and augmented reality.

FIG. 29 shows a schematic diagram of an exemplary computer device 10 for checking a geometric form of a physical dental element using motion tracking and augmented reality. The computer device 10 may be operational with numerous other general-purpose or special-purpose computing system environments or configurations. Computer device 10 may be described in the general context of computer device executable instructions, such as program modules comprising executable program instructions, being executable by the computer device 10. Generally, program modules may include routines, programs, objects, components, logic, data structures, and so on that perform particular tasks or implement particular abstract data types. Computer device 10 may be practiced in distributed computing environments where tasks are performed by remote processing devices that are linked through a communications network. In a distributed computing environment, program modules may be located in both local and remote computer device storage media including memory storage devices.

In FIG. 29, computer device 10 is shown in the form of a general-purpose computing device. The components of computer device 10 may include, but are not limited to, one or more processors or processing units 16, a system memory 28, and a bus 18 that couples various system components including system memory 28 to processor 16. Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer device 10 may comprise a variety of computer device readable storage media. Such media may be any available storage media accessible by computer device 10, and include both volatile and non-volatile storage media, removable and non-removable storage media.

A system memory 28 may include computer device readable storage media in the form of volatile memory, such as random-access memory (RAM) 30 and/or cache memory 32. Computer device 10 may further include other removable/non-removable, volatile/non-volatile computer device storage media. For example, storage system 34 may be provided for reading from and writing to a non-removable, non-volatile magnetic media also referred to as a hard drive. For example, a magnetic disk drive for reading from and writing to a removable, non-volatile magnetic disk, e.g., a floppy disk, and an optical disk drive for reading from or writing to a removable, non-volatile optical disk such as a CD-ROM, DVD-ROM or other optical storage media may be provided. In such instances, each storage medium may be connected to bus 18 by one or more data media interfaces. Memory 28 may, e.g., include a three-dimensional digital model comprising a three-dimensional digital dental element. The three-dimensional digital dental element defines a geometric limit for the geometric form of the physical dental element. Memory 28 may, e.g., include a three-dimensional digital structural model defining structural elements to be detected within optical imaging data and their spatial relations to each other.

Program 40 may have a set of one or more program modules 42 and by way of example be stored in memory 28. The program modules 42 may comprise an operating system, one or more application programs, other program modules, and/or program data. Each of these program modules 42, i.e., the operating system, the one or more application programs, the other program modules, and/or the program data or some combination thereof, may include an implementation of a networking environment. One or more of the program modules 42 may be configured for checking a geometric form of a physical dental element using motion tracking and augmented reality. this checking may, e.g., comprise a receiving of a three-dimensional digital model comprising a three-dimensional digital dental element. The three-dimensional digital model may, e.g., be stored in memory 28. The three-dimensional digital dental element defines a geometric limit for the geometric form of the physical dental element. Furthermore, the following may be repeated: a receiving of optical imaging data from an optical sensor device, e.g., comprised by the external devices 14, a detecting of structural elements within the optical imaging data with the structural elements defining reference points for a target position for the three-dimensional digital dental element, a determining of the target position for the three-dimensional digital dental element using the reference points defined by the structural elements, and a controlling of an electronic display device 24 for displaying an augmented reality view on the physical dental element augmented with the three-dimensional digital dental element. At least a part of the three-dimensional digital dental element may be arranged at the target position. The augmentation with the at least part of the three-dimensional digital dental element may be indicative of whether the geometric form of the physical dental element complies with the geometric limit defined by the three-dimensional digital dental element arranged at the target position.

Computer device 10 may communicate with one or more external devices 14 such as an optical sensor device. The one or more external devices 14 may further comprise, e.g., a keyboard, a pointing device, like a mouse, and a display 24 enabling a user to interact with computer device 10. Such communication may occur via input/output (I/O) interfaces 22. Computer device 10 may further communicate with one or more networks such as a local area network (LAN), a general wide area network (WAN), and/or a public network, like the Internet, via network adapter 20. Network adapter 20 may communicate with other components of computer device 10 via bus 18. It should be understood that although not shown, other hardware and/or software components could be used in conjunction with computer device 10.

The computer device 10 shown in FIG. 29 may, e.g., be configured for checking a geometric form of a physical dental element using motion tracking and augmented reality.

Figure 30:
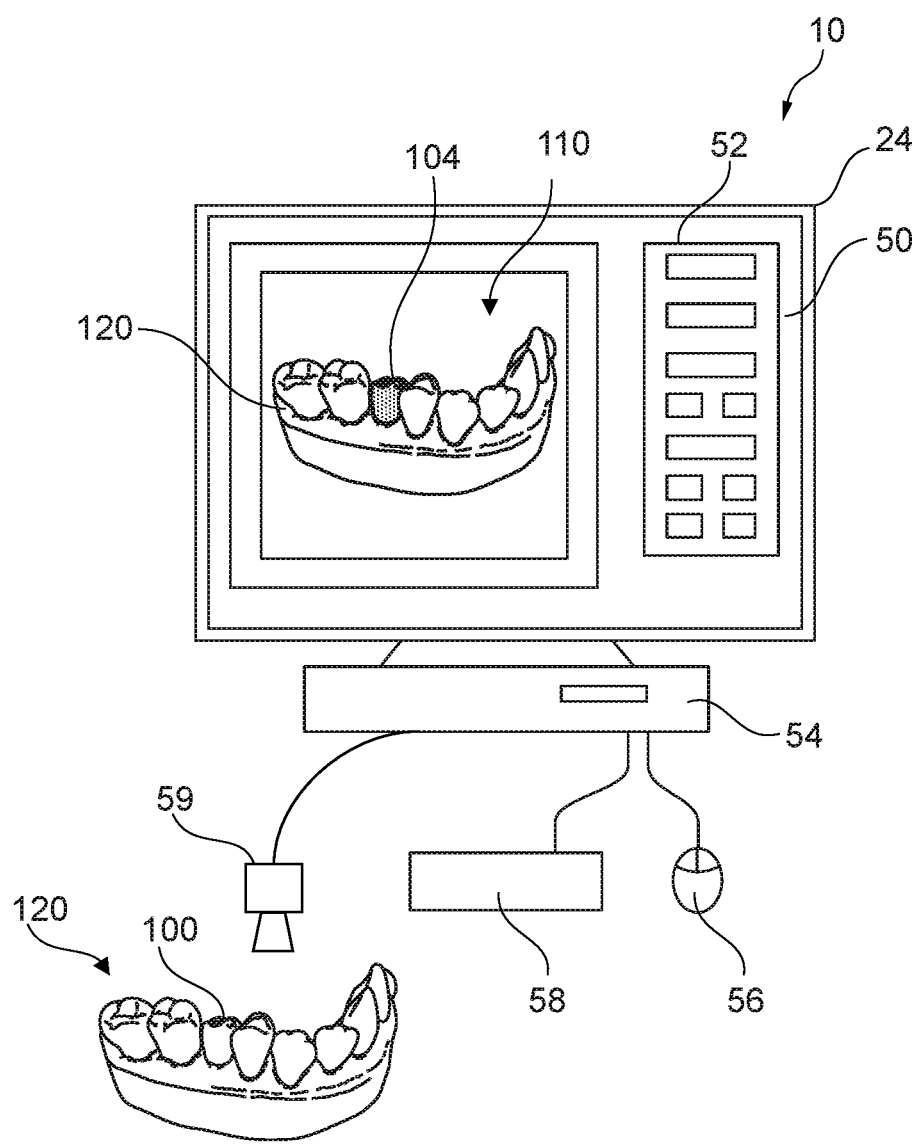
FIG. 30 shows an exemplary computer device for checking a geometric form of a physical dental element using motion tracking and augmented reality.

FIG. 30 shows an exemplary computer device 10 for checking a geometric form of a physical dental element 100 using motion tracking and augmented reality. The computer device 10 may, e.g., be configured as shown in FIG. 29. The computer device 10 may comprise a hardware component 54 comprising one or more processors as well as a memory storing machine-executable program instructions. Execution of the program instructions by the one or more processors may cause the one or more processors to control the computer device 10 to enable a checking of a geometric form of a physical dental element 100 using motion tracking and augmented reality.

The computer device 10 may further comprise one or more input devices, like a keyboard 58 and a mouse 56, enabling a user to interact with the computer device 10. The computer device 10 may, e.g., comprise one or more optical scanners 59 configured for acquiring optical imaging data of a physical dental element 100. Fr example, the physical dental element may, e.g., be arranged in form of a crown within a physical dentition model 120, which is scanned using the one or more optical scanners 59. Furthermore, the computer device 10 may comprise one or more output devices, like a display 24 providing a graphical user interface 50 with control elements 52, e.g., GUI elements. The display 24 may, e.g., configured for displaying an augmented reality view 110 on the physical dental element 100 augmented with the three-dimensional digital dental element 104. The physical dental element 100 may, e.g., be arranged within a physical dentition model 120. For example, an additional electronic display device may be provided, which is configured for displaying an augmented reality view on the physical dental element augmented with the three-dimensional digital dental element. The computer device 10 shown in FIG. 30 may, e.g., be configured for checking a geometric form of a physical dental element 100 using motion tracking and augmented reality.

Figure 31:
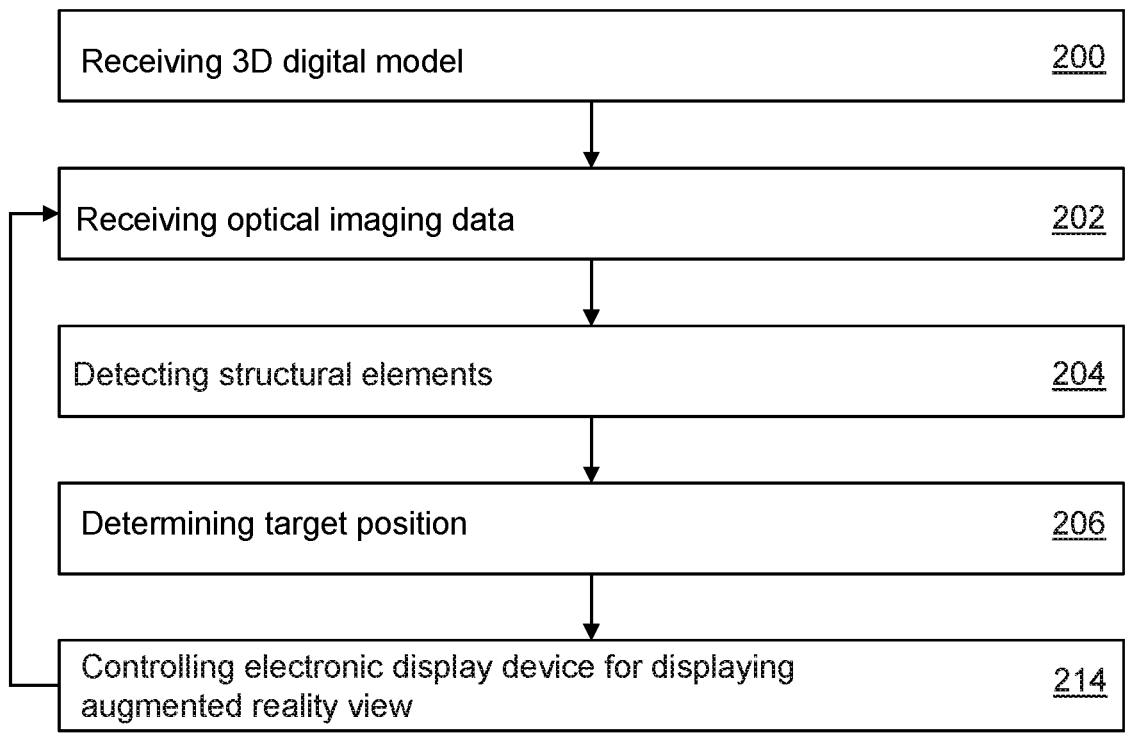
FIG. 31 shows a flowchart illustrating an exemplary method for checking a geometric form of a physical dental element using motion tracking and augmented reality.

FIG. 31 shows an exemplary method for checking a geometric form of a physical dental element using motion tracking and augmented reality. In block 200, a three-dimensional digital model is received, which comprises a three-dimensional digital dental element. The three-dimensional digital dental element defines a geometric limit for the geometric form of the physical dental element. The method further comprises a repeated execution of blocks 202 to 214. In block 202, optical imaging is received data from an optical sensor device.

In block 204, structural elements are detected within the optical imaging data. These structural elements define reference points for a target position for the three-dimensional digital dental element. In order to enable and/or facilitate the detection of the structural elements, a three-dimensional digital structural model defining the structural elements, e.g., characteristic geometric features, like contour points and/or contour lines of the same, as well as their spatial relations to each other. The three-dimensional digital structural model is, e.g., three-dimensional digital a structural model of the physical dental element defining characteristic structural elements of the physical dental element and their spatial relations to each other. The characteristic structural elements, e.g., comprising characteristic contour point points and/or contour lines of the physical dental element. The structural model may, e.g., be generated using the three-dimensional digital template of the physical dental element. Using the three-dimensional digital structural model may facilitate the detection, i.e., recognition of the structural elements comprised by the physical dental element, since the structural model defines what to look for. For example, the structural elements may comprise one or more artificial structural markers. Using such artificial marker as the structural elements may facilitate the detection of the structural elements, since the artificial marker may be easier to be detected. For example, the artificial structural markers may be formed such that they are easily distinguished from other structural elements, in particular elements of dental structures. For example, the three-dimensional digital structural model may comprise the artificial structural markers. The three-dimensional digital structural model may, e.g., comprise characteristic contour point points and/or contour lines of the artificial structural markers. The structural model may, e.g., be generated using the three-dimensional digital template of the physical dental element to which artificial structural markers are digitally added.

In block 206, the target position for the three-dimensional digital dental element is determined using the reference points defined by the structural elements. In block 214, an electronic display device is controlled for displaying an augmented reality view on the physical dental element augmented with the three-dimensional digital dental element. At least a part of the three-dimensional digital dental element is arranged at the target position. The augmentation with the at least part of the three-dimensional digital dental element is indicative of whether the geometric form of the physical dental element complies with the geometric limit defined by the three-dimensional digital dental element arranged at the target position.

Figure 32:
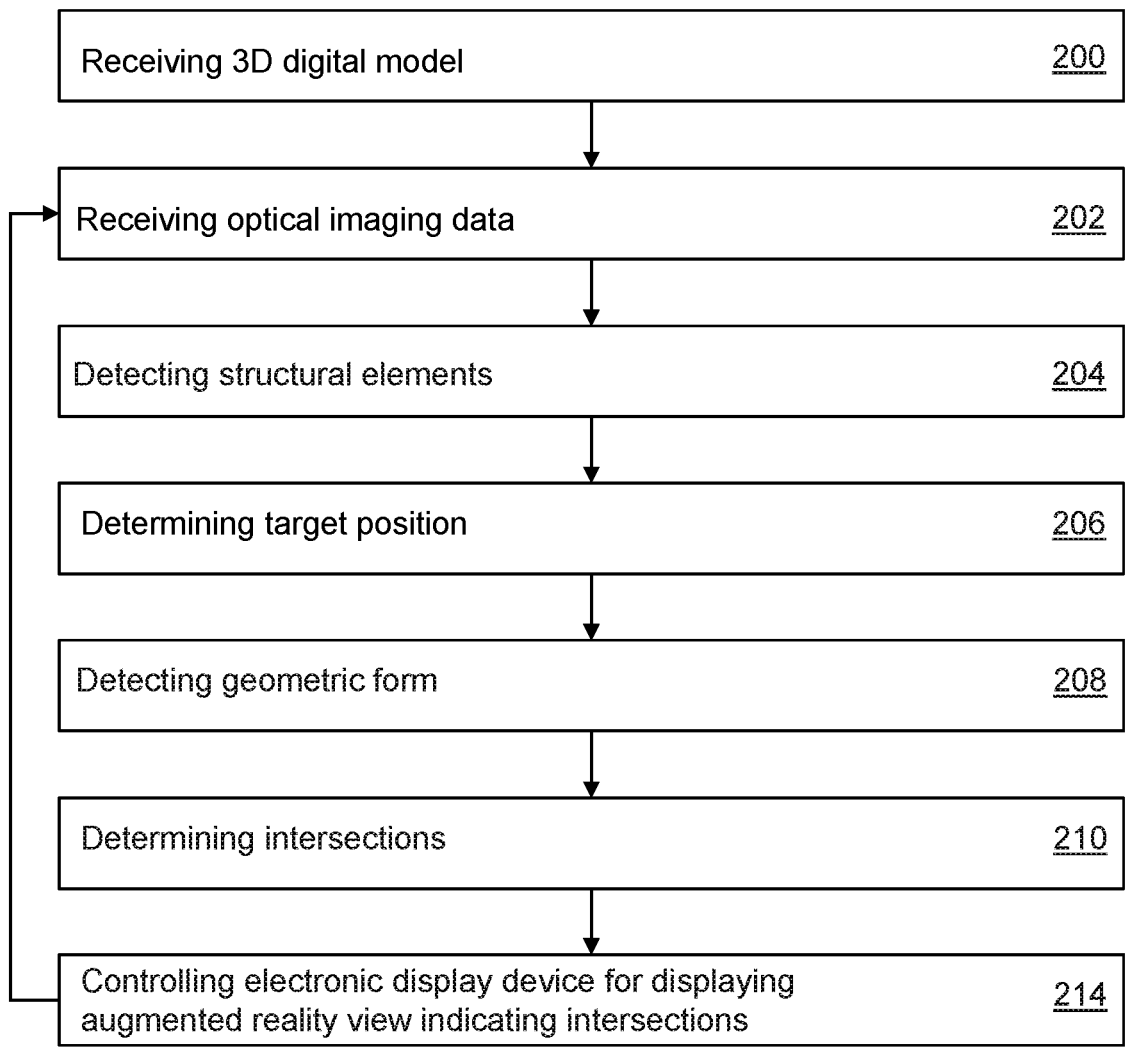
FIG. 32 shows a flowchart illustrating an exemplary method for checking a geometric form of a physical dental element using motion tracking and augmented reality.

FIG. 32 shows an exemplary method for checking a geometric form of a physical dental element using motion tracking and augmented reality. In block 200, a three-dimensional digital model is received, which comprises a three-dimensional digital dental element. The three-dimensional digital dental element defines a geometric limit for the geometric form of the physical dental element. The method further comprises a repeated execution of blocks 202 to 214. In block 202, optical imaging is received data from an optical sensor device.

In block 204, structural elements are detected within the optical imaging data. These structural elements define reference points for a target position for the three-dimensional digital dental element. In order to enable and/or facilitate the detection of the structural elements, a three-dimensional digital structural model defining the structural elements, e.g., characteristic geometric features, like contour points and/or contour lines of the same, as well as their spatial relations to each other. The three-dimensional digital structural model is, e.g., three-dimensional digital a structural model of the physical dental element defining characteristic structural elements of the physical dental element and their spatial relations to each other. The characteristic structural elements, e.g., comprising characteristic contour point points and/or contour lines of the physical dental element. The structural model may, e.g., be generated using the three-dimensional digital template of the physical dental element. Using the three-dimensional digital structural model may facilitate the detection, i.e., recognition of the structural elements comprised by the physical dental element, since the structural model defines what to look for. For example, the structural elements may comprise one or more artificial structural markers. Using such artificial marker as the structural elements may facilitate the detection of the structural elements, since the artificial marker may be easier to be detected. For example, the artificial structural markers may be formed such that they are easily distinguished from other structural elements, in particular elements of dental structures. For example, the three-dimensional digital structural model may comprise the artificial structural markers. The three-dimensional digital structural model may, e.g., comprise characteristic contour point points and/or contour lines of the artificial structural markers. The structural model may, e.g., be generated using the three-dimensional digital template of the physical dental element to which artificial structural markers are digitally added.

In block 206, the target position for the three-dimensional digital dental element is determined using the reference points defined by the structural elements. In block 208, the geometric form of the physical dental element may be detected using the optical imaging data received in block 202. In block 210, one or more intersections of a surface of the physical dental element and a surface of the three-dimensional digital dental element arranged at the target position are determined. For determining the one or more intersections, the geometric form of the physical dental element detected in block 208 may be used. In block 214, an electronic display device is controlled for displaying an augmented reality view on the physical dental element augmented with the three-dimensional digital dental element. At least a part of the three-dimensional digital dental element is arranged at the target position. The augmentation with the at least part of the three-dimensional digital dental element is indicative of whether the geometric form of the physical dental element complies with the geometric limit defined by the three-dimensional digital dental element arranged at the target position. For example, the one or more intersections determined in block 210 may be indicated. The one or more intersections of the displayed three-dimensional digital dental element may, e.g., be highlighted. This may enable a user to identify efficiently sections of the physical dental element intersecting with the three-dimensional digital dental element, since the intersections comprised by the three-dimensional digital dental element are highlighted. The user may, e.g., adjust the geometric form of the physical dental element by removing dental material from the physical dental element which is intersects with the three-dimensional digital dental element, i.e., is highlighted by the highlighted intersections. Due to the repetition of blocks 202 to 214, the augmented reality view on the physical dental element may show, e.g., in real time on the fly, the progress of the adjustment. For example, the highlighted intersections may be successively reduced by successive adjustments, e.g., removal of dental material from the physical dental element, until the highlighted intersections vanish, i.e., no intersections remain, and the adjusted geometric form complies with the geometric limit. The augmented reality view may show the user the progress of the adjustments, while they are executed.

Figure 33:
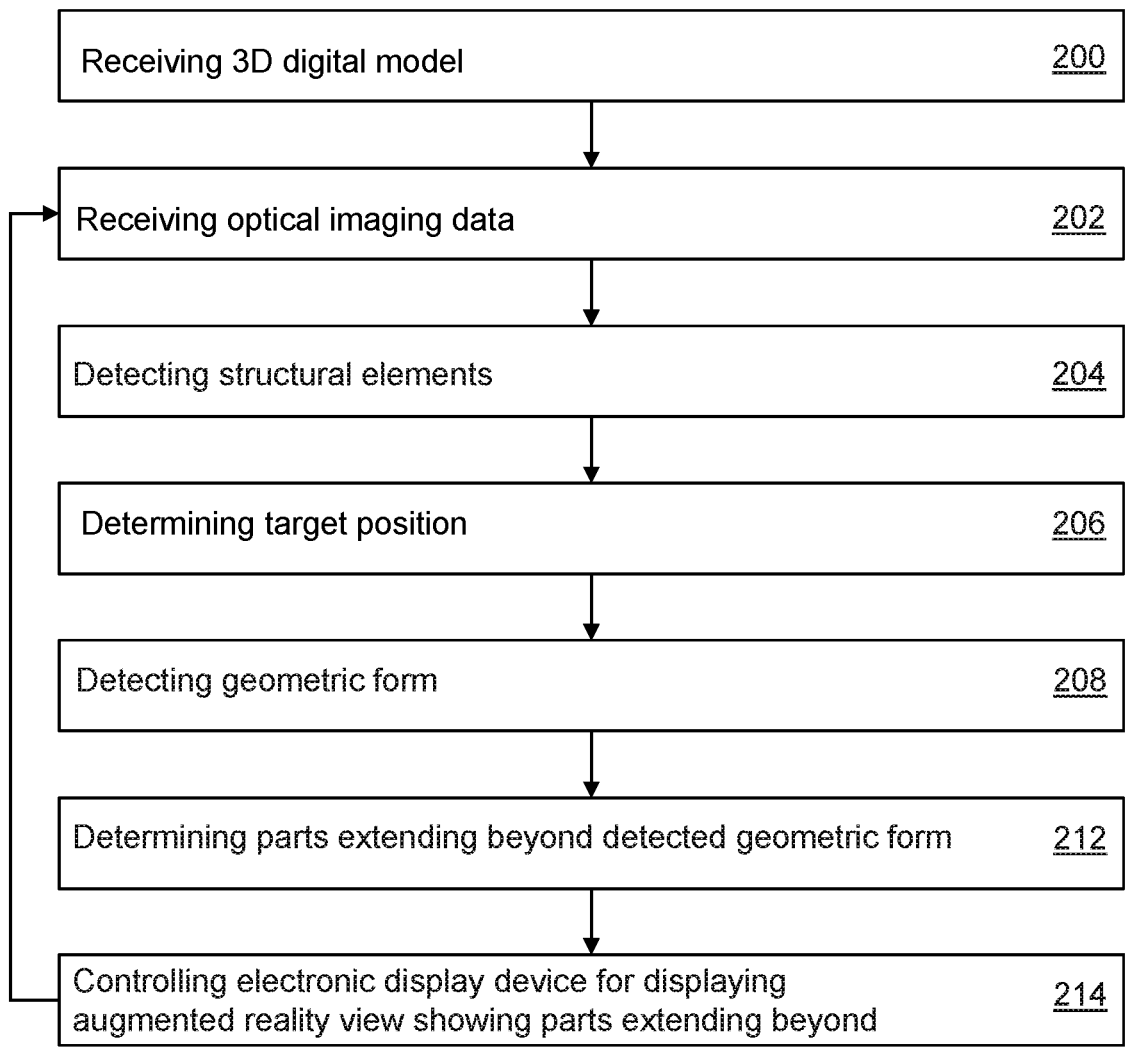
FIG. 33 shows a flowchart illustrating an exemplary method for checking a geometric form of a physical dental element using motion tracking and augmented reality.

FIG. 33 shows an exemplary method for checking a geometric form of a physical dental element using motion tracking and augmented reality. In block 200, a three-dimensional digital model is received, which comprises a three-dimensional digital dental element. The three-dimensional digital dental element defines a geometric limit for the geometric form of the physical dental element. The method further comprises a repeated execution of blocks 202 to 214. In block 202, optical imaging is received data from an optical sensor device.

In block 204, structural elements are detected within the optical imaging data. These structural elements define reference points for a target position for the three-dimensional digital dental element. In order to enable and/or facilitate the detection of the structural elements, a three-dimensional digital structural model defining the structural elements, e.g., characteristic geometric features, like contour points and/or contour lines of the same, as well as their spatial relations to each other. The three-dimensional digital structural model is, e.g., three-dimensional digital a structural model of the physical dental element defining characteristic structural elements of the physical dental element and their spatial relations to each other. The characteristic structural elements, e.g., comprising characteristic contour point points and/or contour lines of the physical dental element. The structural model may, e.g., be generated using the three-dimensional digital template of the physical dental element. Using the three-dimensional digital structural model may facilitate the detection, i.e., recognition of the structural elements comprised by the physical dental element, since the structural model defines what to look for. For example, the structural elements may comprise one or more artificial structural markers. Using such artificial marker as the structural elements may facilitate the detection of the structural elements, since the artificial marker may be easier to be detected. For example, the artificial structural markers may be formed such that they are easily distinguished from other structural elements, in particular elements of dental structures. For example, the three-dimensional digital structural model may comprise the artificial structural markers. The three-dimensional digital structural model may, e.g., comprise characteristic contour point points and/or contour lines of the artificial structural markers. The structural model may, e.g., be generated using the three-dimensional digital template of the physical dental element to which artificial structural markers are digitally added.

In block 206, the target position for the three-dimensional digital dental element is determined using the reference points defined by the structural elements. In block 208, the geometric form of the physical dental element may be detected using the optical imaging data received in block 202. In block 212, one or more parts of the three-dimensional digital dental element in form of the three-dimensional digital template of the physical dental element are determined to extend beyond the detected geometric form of the physical dental element. In block 214, an electronic display device is controlled for displaying an augmented reality view on the physical dental element augmented with the three-dimensional digital dental element. At least a part of the three-dimensional digital dental element is arranged at the target position. The augmentation with the at least part of the three-dimensional digital dental element is indicative of whether the geometric form of the physical dental element complies with the geometric limit defined by the three-dimensional digital dental element arranged at the target position. For example, the electronic display device is controlled to display only the determined one or more parts of the three-dimensional digital dental element extending beyond the geometric form of the physical dental element detected in block 208, while the rest of the three-dimensional digital dental element not extending beyond the detected geometric form of the physical dental element is not display. This may enable a user to adjust the geometric form of the physical dental element, e.g., by adding dental material to the physical dental element. In order adjust the geometric form of the physical dental element, e.g., dental material may be added at the positions and in the form of the displayed parts of the three-dimensional digital dental element extending beyond the detected geometric form of the physical dental element. Due to the repetition of blocks 202 to 214, the augmented reality view on the physical dental element may show, e.g., in real time on the fly, the progress of the adjustment. For example, the displayed parts of the three-dimensional digital dental element extending beyond the detected geometric form of the physical dental element may be successively reduced by successive adjustments, e.g., adding of dental material to the physical dental element and thereby extending its geometric form, which is detected, until no parts extend beyond the adjusted and detected geometric form anymore. In case the adjusted geometric form of the physical dental element with the dental material added matches the combination of the geometric form of the physical dental element with the displayed parts of the three-dimensional digital dental element extending beyond the detected geometric form, the adjusted geometric form may comply with the geometric limit, i.e., coincide with the same. The augmented reality view may show the user the progress of the adjustments, while they are executed.

Figure 34:
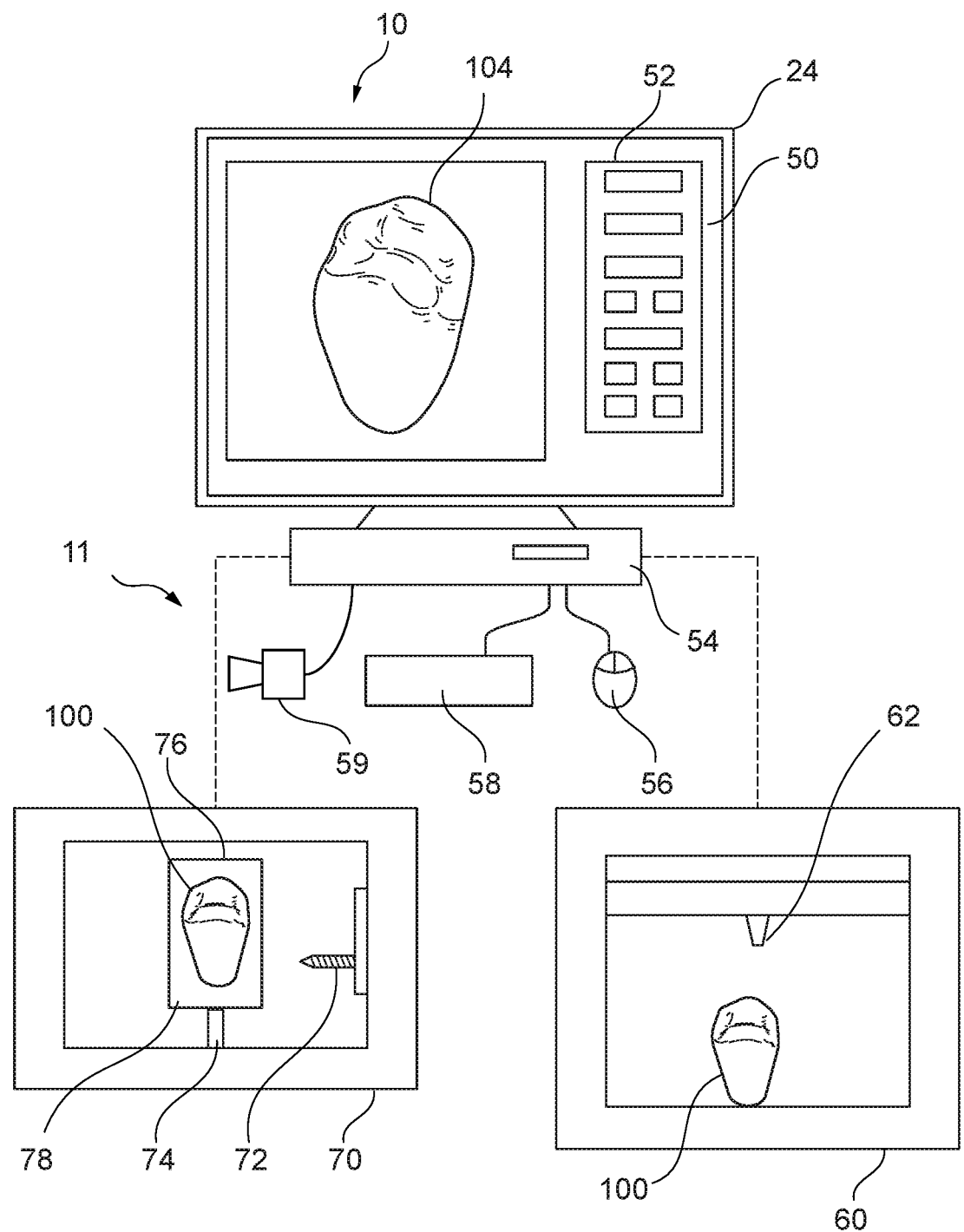
FIG. 34 shows an exemplary system for checking a geometric form of a physical dental element using motion tracking and augmented reality.

FIG. 34 shows an exemplary manufacturing system 11 for manufacturing a physical dental element. The manufacturing system 11 may, e.g., be used for providing the physical dental element 100 to be checked using motion tracking and augmented reality. For example, the methods described in FIGS. 31 to 33 may be used to check a geometric form of a physical dental element manufactured using manufacturing system 11. For example, a three-dimensional digital model 104 of the dental element may be provided as a template used manufacturing the physical dental element 100 as a physical copy of the template.

The manufacturing system 11 may comprise the computer device, e.g., the computer device 10 of FIG. 30 or an additional computer device independent of computer device 10 of FIG. 30. The computer device 10 may further be configured to control one or more manufacturing devices 60, 70. For example, the manufacturing system 11 may comprise a manufacturing device in form of a machining device 70 controlled by the computer device 10. The machining device 70 may be configured to machining a blank 76 using one or more machining tools 72. The blank 76 of raw material 78, may be provided using a holding device 74 and cut into a desired shape and size of the element to be manufactured, e.g., the physical dental element 100 or parts thereof. The machining tool 72 may, e.g., be a milling tool.

For example, the manufacturing system 11 may comprise a manufacturing device in form of a 3D printing device 60. The 3D printing device 60 may be controlled by the computer device 10 and configured to print an element to be manufactured, e.g., the physical dental element 100 or parts thereof. The 3D printing device 60 may comprise a printing element 62 configured to print the respective element, like the dental restoration element, layer by layer. The printing element 62 may, e.g., comprise a nozzle configured for distributing printing material.

In case metal is to be used for manufacturing the element to be manufactured with the 3D printing device 60, the 3D printing device 60 may, e.g., be configured for executing selective laser sintering or melting. Selective laser sintering uses a laser for sintering a powdered material, aiming the laser automatically at points in space defined by a three-dimensional digital model of the element to be printed. The laser energy may result in a local sintering or melting of the powdered material, binding the material together to create a solid structure. For example, the printing element 62 of the 3D printing device 60 may comprise a laser and/or a distributing device for distributing the powdered material.

For example, the three-dimensional digital model 104 of the physical dental element 100 may be used as a positive to define a negative of the physical dental element 100 in form of a negative three-dimensional digital model of the physical dental element 100. The negative three-dimensional digital model of the dental element may be used to manufacture, e.g., using machining device 70 or 3D printing device 60, a casting matrix. The casting matrix may be configured for casting the physical dental restoration element by inserting dental material into the casting matrix and curing the inserted dental material.

FIG. 35 shows exemplary electronic display devices 24, which are configured for displaying an augmented reality view. These electronic display devices 24 may be used by a user 12 for displaying an augmented reality view on a physical dental element augmented with a three-dimensional digital dental element. At least a part of the three-dimensional digital dental element, with which the augmented reality view on the physical dental element is augmented, is arranged at a target position. The augmentation with the at least part of the three-dimensional digital dental element being indicative of whether a geometric form of the physical dental element complies with a geometric limit defined by the three-dimensional digital dental element arranged at the target position.

For example, an electronic display device 24 may comprise a non-transparent display displaying the part of the three-dimensional digital dental element in combination with a continuous sequence of frames. The frames are generated using images generated using repeatedly received optical imaging data acquired by one or more optical sensor device. The repeatedly received optical imaging data comprises optical imaging data of the physical dental element.

The electronic display device 24 may, e.g., be provided in form of a headset 81, like a virtual reality headset, comprising one or more cameras to intercept a real-world view in form of optical imaging data acquired by the cameras and re-display an augmented reality view using a display comprised by the headset 81. The headset 81 may, e.g., be worn by a user 12 handling the physical dental element and trying to checking the geometric form of the physical dental element, i.e., checking, whether the geometric form of the physical dental element complies with the geometric limit defined by the three-dimensional digital dental element arranged at the target position.

The electronic display device 24 may, e.g., be provided in form of a computer screen 83, which is, e.g., connected to a computer device 10. One or more cameras, e.g., connected to a computer device 10 may be used to acquire optical imaging data providing a recorded reality view on the physical dental element. The reality view is augmented and displayed using the computer screen 83. The computer screen 83 may, e.g., be used by the user 12 handling the physical dental element and trying to checking the geometric form of the physical dental element, i.e., checking, whether the geometric form of the physical dental element complies with the geometric limit defined by the three-dimensional digital dental element arranged at the target position.

The electronic display device 24 may, e.g., be provided in form of a tablet 84 or any other mobile portable terminal comprising a display. One or more cameras of the tablet 84 or connected to the tablet 84 may be used to acquire optical imaging data providing a recorded reality view on the physical dental element. The reality view is augmented and displayed using the tablet 84. The tablet 84 may, e.g., be used by the user 12 handling the physical dental element and trying to checking the geometric form of the physical dental element, i.e., checking, whether the geometric form of the physical dental element complies with the geometric limit defined by the three-dimensional digital dental element arranged at the target position.

For example, the electronic display device 24, e.g., provided in form of eyeglasses 82, may be configured to augment a visual perception of the physical dental element by user 12 of the electronic display device 24 with the part of the displayed three-dimensional digital dental element. The displayed part of the three-dimensional digital dental element may, e.g., be projected through or reflected off a surface of a transparent lens piece of the eyeglasses 82. One or more cameras of the eyeglasses 82 or connected to the eyeglasses 82 may be used to acquire optical imaging data for determining the target position, at which the at least part of the three-dimensional digital dental element has to be arranged. The target position may, e.g., be a target position on the surfaces of the transparent lens piece of the eyeglasses 82, such that user 12 looking through the transparent lens piece onto the physical dental element sees a superposition of the physical dental element with the at least part of the three-dimensional digital dental element. The eyeglasses 82 may, e.g., be used by the user 12 handling the physical dental element and trying to checking the geometric form of the physical dental element, i.e., checking, whether the geometric form of the physical dental element complies with the geometric limit defined by the three-dimensional digital dental element arranged at the target position.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

A single processor or other unit may fulfill the functions of several items recited in the claims. A computer program may be stored/distributed on a suitable medium, such as an optical storage medium or a solid-state medium supplied together with or as part of other hardware, but may also be distributed in other forms, such as via the Internet or other wired or wireless telecommunication systems.

As will be appreciated by one skilled in the art, aspects of the present invention may be embodied as an apparatus, method, computer program or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon. A computer program comprises the computer executable code or "program instructions".

Any combination of one or more computer readable medium(s) may be utilized. The computer readable medium may be a computer readable signal medium or a computer readable storage medium. A "computer-readable storage medium" as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. For example, a computer-readable storage medium may also be able to store data which is able to be accessed by the processor of the computing device. Examples of computer-readable storage media include, but are not limited to: a floppy disk, a magnetic hard disk drive, a solid-state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. A further example of an optical disk may be a Blu-ray disk. The term computer readable-storage medium also refers to various types of recording media capable of being accessed by the computer device via a network or communication link. For example, a data may be retrieved over a modem, over the internet, or over a local area network. Computer executable code embodied on a computer readable medium may be transmitted using any appropriate medium, including but not limited to wireless, wireline, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

"Computer memory" or "memory" is an example of a computer-readable storage medium. Computer memory is any memory which is directly accessible to a processor. "Computer storage" or "storage" is a further example of a computer-readable storage medium. Computer storage is any non-volatile computer-readable storage medium. For example, computer storage may also be computer memory or vice versa.

A "processor" as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer device or distributed amongst multiple computer devices. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object-oriented programming language such as Java, Smalltalk, C++or the like and conventional procedural programming languages, such as the "C" programming language or similar programming languages and compiled into machine executable instructions. In some instances, the computer executable code may be in the form of a high-level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Generally, the program instructions can be executed on one processor or on several processors. In the case of multiple processors, they can be distributed over several different entities like clients, servers etc. Each processor could execute a portion of the instructions intended for that entity. Thus, when referring to a system or process involving multiple entities, the computer program or program instructions are understood to be adapted to be executed by a processor associated or related to the respective entity.

A "user interface" as used herein is an interface which allows a user or operator to interact with a computer or computer device. A 'user interface' may also be referred to as a 'human interface device.' A user interface may provide information or data to the operator and/or receive information or data from the operator. A user interface may enable input from an operator to be received by the computer and may provide output to the user from the computer. In other words, the user interface may allow an operator to control or manipulate a computer and the interface may allow the computer to indicate the effects of the operator's control or manipulation. The display of data or information on a display or a graphical user interface is an example of providing information to an operator. The receiving of data through a keyboard, mouse, trackball, touchpad, pointing stick, graphics tablet, joystick, gamepad, webcam, headset, gear sticks, steering wheel, pedals, wired glove, dance pad, remote control, one or more switches, one or more buttons, and accelerometer are all examples of user interface components which enable the receiving of information or data from an operator.

A GUI element is a data object some of which's attributes specify the shape, layout and/or behavior of an area displayed on a graphical user interface, e.g., a screen. A GUI element can be a standard GUI element such as a button, a text box, a tab, an icon, a text field, a pane, a check-box item or item group or the like. A GUI element can likewise be an image, an alphanumeric character or any combination thereof. At least some of the properties of the displayed GUI elements depend on the data value aggregated on the group of data object said GUI element represents.

Aspects of the present invention are described with reference to flowchart illustrations and/or block diagrams of methods, apparatus (systems) and computer program products. It will be understood that each block or a portion of the blocks of the flowchart, illustrations, and/or block diagrams, can be implemented by computer program instructions in form of computer executable code when applicable. It is further understood that, when not mutually exclusive, combinations of blocks in different flowcharts, illustrations, and/or block diagrams may be combined. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Although the invention has been described in reference to specific embodiments, it should be understood that the invention is not limited to these examples only and that many variations of these embodiments may be readily envisioned by the skilled person after having read the present disclosure. The invention may thus further be described without limitation and by way of example only by the following embodiments. The following embodiments may contain preferred embodiments. Accordingly, the term "feature combination" as used therein may refer to such a "preferred embodiment".

1. A method for checking a geometric form of a physical dental element using motion tracking and augmented reality,
   the method comprising:
   receiving a three-dimensional digital model comprising a three-dimensional digital dental element, the three-dimensional digital dental element defining a geometric limit for the geometric form of the physical dental element,
   repeatedly:
   receiving optical imaging data from an optical sensor device,
   detecting structural elements within the optical imaging data, the structural elements defining reference points for a target position for the three-dimensional digital dental element,
   determining the target position for the three-dimensional digital dental element using the reference points defined by the structural elements,
   controlling an electronic display device for displaying an augmented reality view on the physical dental element augmented with the three-dimensional digital dental element, at least a part of the three-dimensional digital dental element being arranged at the target position, the augmentation with the at least part of the three-dimensional digital dental element being indicative of whether the geometric form of the physical dental element complies with the geometric limit defined by the three-dimensional digital dental element arranged at the target position.

2. The method of feature combination 1, the three-dimensional digital dental element being a three-dimensional digital template of the physical dental element, the target position for the three-dimensional digital dental element coinciding with a position of the physical dental element such that the displayed part of the three-dimensional digital dental element is visually overlaying the physical dental element.

3. The method of feature combination 1, the three-dimensional digital model being a three-dimensional digital model of at least a part of a dentition of a patient, the three-dimensional digital dental element being a three-dimensional digital copy of a dental element comprised by the dentition, the three-dimensional digital model defining a spatial relation of the target position for the three-dimensional digital dental element and a predefined position within the dentition, at which the physical dental element is intended to be arranged.

4. The method of feature combination 3, the three-dimensional digital dental element being a scaled-up three-dimensional digital copy of the dental element comprised by the dentition, which is scaled up by a predefined scaling factor.

5. The method of any of feature combinations 1 to 4, the electronic display device being controlled to adjust a degree of translucency of the displayed three-dimensional digital dental element in response to receiving an input requesting an adjustment of the degree of translucency.

6. The method of any of feature combinations 1 to 5, the repeatedly receiving of the optical imaging, detecting of the structural elements, and determining of the target position being performed with a repetition rate matching a frame rate, with which the electronic display device being controlled to display the augmented reality view.

7. The method of feature combination 6, the electronic display device being controlled to display frames comprising images of the physical dental element, the frames being generated using the repeatedly received optical imaging data comprising optical imaging data of the physical dental element.

8. The method of any of feature combinations 1 to 7, the detected structural elements comprising structural elements of the physical dental element.

9. The method of any of feature combinations 1 to 8, a size of the displayed three-dimensional digital dental element being scaled up by an inverse of a shrinking factor descriptive of a shrinking of a dental material of the physical dental element in case the physical dental element being subject to a curing.

10. The method of any of feature combinations 1 to 9, the physical dental element being arranged within a physical model of the dentition of the patient, the optical imaging data comprising optical imaging data of the physical model of the dentition, the detected structural elements comprising structural element of the physical model of the dentition.

11. The method of feature combination 10, a size of the physical model of the dentition of the patient being scaled up by the inverse of the shrinking factor descriptive of the shrinking of the dental material of the physical dental element in case the physical dental element being subject to a curing.

12. The method of any of feature combinations 10 to 11, the target position of the three-dimensional digital dental element in form of the three-dimensional digital template of the physical dental element defining a predefined position within the physical model, at which the physical dental element is intended to be arranged, the displaying of the part of the three-dimensional digital template at the predefined position being indicative of a deviation between the position of the physical dental element and the predefined position.

13. The method of any of feature combinations 1 to 12, the method further comprising detecting the geometric form of the physical dental element using the repeatedly received optical imaging data.

14. The method of feature combination 13, the method further comprising determining one or more intersections of a surface of the physical dental element and a surface of the three-dimensional digital dental element arranged at the target position, the displaying of the part of the three-dimensional digital dental element being indicative of the one or more intersections.

15. The method of feature combination 14, the method further comprising determining one or more sections of the physical dental element, which are violating the geometric limit for the geometric form using the intersections, the electronic display device being further controlled to highlight the determined one or more sections of the physical dental element.

16. The method of any of feature combinations 13 to 15, the method further comprising determining one or more parts of the three-dimensional digital dental element in form of the three-dimensional digital template of the physical dental element extending beyond the detected geometric form of the physical dental element, the electronic display device being controlled to display only the determined one or more parts of the three-dimensional digital dental element extending beyond the detected geometric form of the physical dental element.

17. The method of any of feature combinations 1 to 16, the method further comprising receiving a three-dimensional digital structural model defining the structural elements and their spatial relations to each other.

18. The method of any of feature combinations 1 to 17, the structural elements comprising one or more artificial structural markers.

19. The method of any of feature combinations 1 to 18, the physical dental element being one of the following: a veneer, an inlay, an onlay, an overlay, a crown, a bridge, a mockup, a waxup, a bitesplint, a provisional, a dental bar, a denture, an overdenture.

20. A computer program product for checking a geometric form of a physical dental element using motion tracking and augmented reality,
the computer program product comprising a computer readable storage medium having program instructions embodied therewith, the program instructions being executable by a processor of a computer device to cause the computer device to:
receive a three-dimensional digital model comprising a three-dimensional digital dental element, the three-dimensional digital dental element defining a geometric limit for the geometric form of the physical dental element,
repeatedly:
receive optical imaging data from an optical sensor device, detect structural elements within the optical imaging data, the structural elements defining reference points for a target position for the three-dimensional digital dental element, determine the target position for the three-dimensional digital dental element using the reference points defined by the structural elements, control an electronic display device for displaying an augmented reality view on the physical dental element augmented with the three-dimensional digital dental element, at least a part of the three-dimensional digital dental element being arranged at the target position, the augmentation with the at least part of the three-dimensional digital dental element being indicative of whether the geometric form of the physical dental element complies with the geometric limit defined by the three-dimensional digital dental element arranged at the target position.

21. A computer program for checking a geometric form of a physical dental element using motion tracking and augmented reality, the computer program comprising program instructions, the program instructions being executable by a processor of a computer device to cause the computer device to:

receive a three-dimensional digital model comprising a three-dimensional digital dental element, the three-dimensional digital dental element defining a geometric limit for the geometric form of the physical dental element, repeatedly:

receive optical imaging data from an optical sensor device, detect structural elements within the optical imaging data, the structural elements defining reference points for a target position for the three-dimensional digital dental element, determine the target position for the three-dimensional digital dental element using the reference points defined by the structural elements, control an electronic display device for displaying an augmented reality view on the physical dental element augmented with the three-dimensional digital dental element, at least a part of the three-dimensional digital dental element being arranged at the target position, the augmentation with the at least part of the three-dimensional digital dental element being indicative of whether the geometric form of the physical dental element complies with the geometric limit defined by the three-dimensional digital dental element arranged at the target position.

22. A computer device for checking a geometric form of a physical dental element using motion tracking and augmented reality, the computer device comprising a processor and a memory storing program instructions executable by the processor, the computer device further comprising means for controlling an electronic display device for displaying at least a part of a three-dimensional digital dental element, execution of the program instructions by the processor causing the computer device to:

receive a three-dimensional digital model comprising a three-dimensional digital dental element, the three-dimensional digital dental element defining a geometric limit for the geometric form of the physical dental element, repeatedly:

receive optical imaging data from an optical sensor device, detect structural elements within the optical imaging data, the structural elements defining reference points for a target position for the three-dimensional digital dental element, determine the target position for the three-dimensional digital dental element using the reference points defined by the structural elements, control the electronic display device for displaying an augmented reality view on the physical dental element augmented with the three-dimensional digital dental element, at least a part of the three-dimensional digital dental element being arranged at the target position, the augmentation with the at least part of the three-dimensional digital dental element being indicative of whether the geometric form of the physical dental element complies with the geometric limit defined by the three-dimensional digital dental element arranged at the target position.

REFERENCE SIGNS LIST 10 computer device
11 manufacturing system
12 user
14 external device
16 processing unit
18 bus
20 network adapter
22 I/O interface
24 display device
28 memory
30 RAM
32 cache
34 storage system
40 program
42 program module
50 user interface
52 control elements
54 hardware device
56 keyboard
58 mouse
59 optical sensor
60 3D printing device
62 printing element
70 machining device
72 machining tool
74 holding device
76 blank
78 raw material
81 virtual reality headset
82 eyeglasses
83 computer screen
84 tablet
100 physical dental element
102 3D digital structural model
104 3D digital dental element
106 section of physical dental element
107 boundary line
108 section of physical dental element
110 augmented reality view
112 optical imaging data
120 physical dentition model
122 3D digital structural model
124 marker 132 prepared tooth
133 tooth reception
135 tooth position
134 neighboring tooth
136 physical marker
138 digital marker

The invention claimed is:

1. A method for checking a geometric form of a physical dental element using motion tracking and augmented reality, the method comprising:
receiving a three-dimensional digital model comprising a three-dimensional digital dental element, the three-dimensional digital dental element defining a geometric limit for the geometric form of the physical dental element,
repeatedly:
receiving optical imaging data from an optical sensor device,
detecting structural elements within the optical imaging data, the
structural elements defining reference points for a target position for the three-dimensional digital dental element,
determining the target position for the three-dimensional digital dental element using the reference points defined by the structural elements,
controlling an electronic display device for displaying an augmented reality view on the physical dental element augmented with the three-dimensional digital dental element, at least a part of the three-dimensional digital dental element being arranged at the target position, the augmentation with the at least part of the three-dimensional digital dental element being indicative of whether the geometric form of the physical dental element complies with the geometric limit defined by the three-dimensional digital dental element arranged at the target position,
the repeatedly receiving of the optical imaging data, detecting of the structural elements, determining of the target position, and the controlling of the electronic display device for displaying the augmented reality view being performed with a repetition rate resulting in a real time impression of the motion tracking.

2. The method of claim 1, the three-dimensional digital dental element being a three-dimensional digital template of the physical dental element, the target position for the three-dimensional digital dental element coinciding with a position of the physical dental element such that the displayed part of the three-dimensional digital dental element is visually overlaying the physical dental element.

3. The method of claim 1, the three-dimensional digital model being a three-dimensional digital model of at least a part of a dentition of a patient, the three-dimensional digital dental element being a three-dimensional digital copy of a dental element comprised by the dentition, the three-dimensional digital model defining a spatial relation of the target position for the three-dimensional digital dental element and a predefined position within the dentition, at which the physical dental element is intended to be arranged.

4. The method of claim 3, the three-dimensional digital dental element being a scaled-up three-dimensional digital copy of the dental element comprised by the dentition, which is scaled up by a predefined scaling factor.

5. The method of claim 1, the electronic display device being controlled to adjust a degree of translucency of the displayed three-dimensional digital dental element in response to receiving an input requesting an adjustment of the degree of translucency.

6. The method of claim 1, the electronic display device being controlled to display frames comprising images of the physical dental element, the frames being generated using the repeatedly received optical imaging data comprising optical imaging data of the physical dental element.

7. The method of claim 1, the detected structural elements comprising structural elements of the physical dental element.

8. The method of claim 1, a size of the displayed three-dimensional digital dental element being scaled up by an inverse of a shrinking factor descriptive of a shrinking of a dental material of the physical dental element in case the physical dental element being subject to a curing.

9. The method of claim 1, the physical dental element being arranged within a physical model of a dentition of a patient, the optical imaging data comprising optical imaging data of the physical model of the dentition, the detected structural elements comprising structural element of the physical model of the dentition.

10. The method of claim 9, a size of the physical model of the dentition of the patient being scaled up by an inverse of a shrinking factor descriptive of a shrinking of a dental material of the physical dental element in case the physical dental element being subject to a curing.

11. The method of claim 9, the target position of the three-dimensional digital dental element in form of a three-dimensional digital template of the physical dental element defining a predefined position within the physical model, at which the physical dental element is intended to be arranged, the displaying of the part of the three-dimensional digital template at the predefined position being indicative of a deviation between the position of the physical dental element and the predefined position.

12. The method of claim 1, the method further comprising detecting the geometric form of the physical dental element using the repeatedly received optical imaging data.

13. The method of claim 12, the method further comprising determining one or more intersections of a surface of the physical dental element and a surface of the three-dimensional digital dental element arranged at the target position, the displaying of the part of the three-dimensional digital dental element being indicative of the one or more intersections.

14. The method of claim 13, the method further comprising determining one or more sections of the physical dental element, which are violating the geometric limit for the geometric form using the intersections, the electronic display device being further controlled to highlight the determined one or more sections of the physical dental element.

15. The method of claim 12, the method further comprising determining one or more parts of the three-dimensional digital dental element in form of a three-dimensional digital template of the physical dental element extending beyond the detected geometric form of the physical dental element, the electronic display device being controlled to display only the determined one or more parts of the three-dimensional digital dental element extending beyond the detected geometric form of the physical dental element.

16. The method of claim 1, the method further comprising receiving a three-dimensional digital structural model defining the structural elements and their spatial relations to each other.

17. The method of claim 1, the structural elements comprising one or more artificial structural markers.

18. The method of claim 1, the physical dental element being one of the following: a veneer, an inlay, an onlay, an overlay, a crown, a bridge, a mockup, a waxup, a bitesplint, a provisional, a dental bar, a denture, an overdenture.

19. A computer program product for checking a geometric form of a physical dental element using motion tracking and augmented reality, the computer program product comprising a non-transitory computer readable storage medium comprising program instructions embodied therewith, the program instructions being executable by a processor of a computer device to cause the computer device to:

receive a three-dimensional digital model comprising a three-dimensional digital dental element, the three-dimensional digital dental element defining a geometric limit for the geometric form of the physical dental element, repeatedly:
receive optical imaging data from an optical sensor device,
detect structural elements within the optical imaging data, the structural elements defining reference points for a target position for the three-dimensional digital dental element,
determine the target position for the three-dimensional digital dental element using the reference points defined by the structural elements,
control an electronic display device for displaying an augmented reality view on the physical dental element augmented with the three-dimensional digital dental element, at least a part of the three-dimensional digital dental element being arranged at the target position, the augmentation with the at least part of the three-dimensional digital dental element being indicative of whether the geometric form of the physical dental element complies with the geometric limit defined by the three-dimensional digital dental element arranged at the target position,
the repeatedly receiving of the optical imaging data, detecting of the structural elements, determining of the target position, and the controlling of the electronic display device for displaying the augmented reality view being performed with a repetition rate resulting in a real time impression of the motion tracking.

20. A computer device for checking a geometric form of a physical dental element using motion tracking and augmented reality, the computer device comprising a processor and a memory storing program instructions executable by the processor, the computer device further comprising means for controlling an electronic display device for displaying at least a part of a three-dimensional digital dental element, execution of the program instructions by the processor causing the computer device to:

receive a three-dimensional digital model comprising a three-dimensional digital dental element, the three-dimensional digital dental element defining a geometric limit for the geometric form of the physical dental element, repeatedly:
receive optical imaging data from an optical sensor device,
detect structural elements within the optical imaging data, the structural elements defining reference points for a target position for the three-dimensional digital dental element,
determine the target position for the three-dimensional digital dental element using the reference points defined by the structural elements,
control the electronic display device for displaying an augmented reality view on the physical dental element augmented with the three-dimensional digital dental element, at least a part of the three-dimensional digital dental element being arranged at the target position, the augmentation with the at least part of the three-dimensional digital dental element being indicative of whether the geometric form of the physical dental element complies with the geometric limit defined by the three-dimensional digital dental element arranged at the target position,
the repeatedly receiving of the optical imaging data, detecting of the structural elements, determining of the target position, and the controlling of the electronic display device for displaying the augmented reality view being performed with a repetition rate resulting in a real time impression of the motion tracking.

* * * * *